US012092980B2

(12) United States Patent
Suzuki et al.

(10) Patent No.: US 12,092,980 B2
(45) Date of Patent: Sep. 17, 2024

(54) CALCULATION SYSTEM, IMAGE FORMING APPARATUS, AND IMAGE FORMING SYSTEM

(71) Applicant: CANON KABUSHIKI KAISHA, Tokyo (JP)

(72) Inventors: Koji Suzuki, Chiba (JP); Keisuke Mogi, Chiba (JP); Hisashi Tsukijima, Ibaraki (JP); Yuma Inui, Ibaraki (JP); Yoshiya Numata, Ibaraki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 17/931,502

(22) Filed: Sep. 12, 2022

(65) Prior Publication Data

US 2023/0078048 A1 Mar. 16, 2023

(30) Foreign Application Priority Data

Sep. 15, 2021 (JP) ................................ 2021-149851
Sep. 15, 2021 (JP) ................................ 2021-149855
Jun. 27, 2022 (JP) ................................ 2022-102722

(51) Int. Cl.
*G03G 15/00* (2006.01)
*G03G 15/20* (2006.01)

(52) U.S. Cl.
CPC ..... *G03G 15/5029* (2013.01); *G03G 15/2039* (2013.01); *G03G 15/6573* (2013.01); *G03G 2215/00776* (2013.01); *G03G 2215/00877* (2013.01)

(58) Field of Classification Search
CPC ....... G03G 2215/0059; G03G 15/5029; G03G 15/00776; G03G 15/2039; G03G 15/6573; G03G 2215/00776; G03G 2215/00877
See application file for complete search history.

(56) References Cited

U.S. PATENT DOCUMENTS 4,792,828 A * 12/1988 Ozawa ............... G03G 15/5029 399/202
2005/0151985 A1* 7/2005 Hisamura .......... H04N 1/00002 399/407
2013/0155428 A1* 6/2013 Mizuno .................. G06K 15/02 358/1.9
2015/0362870 A1* 12/2015 Ogushi ............. G03G 15/2039 399/69

FOREIGN PATENT DOCUMENTS

JP 2004107073 A * 4/2004
JP 2009-067560 A 4/2009
JP 2012-194361 A 10/2012
JP 2017151376 A * 8/2017

* cited by examiner

*Primary Examiner* — Jennifer Bahls
(74) *Attorney, Agent, or Firm* — Canon U.S.A., Inc. IP Division

(57) ABSTRACT

A calculation system includes an obtaining unit and a calculation unit. The obtaining unit obtains information of a sheet. The calculation unit calculates an amount of change in length of the sheet in a conveyance direction of the sheet heated by a heating device to fix a toner image to the sheet based on the information of the sheet obtained by the obtaining unit and an elapsed time from a time when the sheet passes through the heating device.

22 Claims, 18 Drawing Sheets

$$W(t) = W_{\mathrm{inf}} + (W_0 - W_{\mathrm{inf}})\exp(-Bt)$$

$$\Delta W(t) = \Delta W_0 \exp(-Bt)$$

$$\Delta L(t) = q \cdot \Delta W(t)^{C/B}$$

| | FINE PAPER 1 81gsm | FINE PAPER 2 157gsm | FINE PAPER 3 300gsm | COATED PAPER 84.9gsm |
|---|---|---|---|---|
| MOISTURE ABSORPTION COEFFICIENT B | 0.012 | 0.007 | 0.004 | 0.009 |
| SHEET LENGTH CHANGE RATE C | 0.008 | 0.005 | 0.002 | 0.004 |
| MOISTURE EXPANSION RATE q | 0.660 | 0.657 | 0.688 | 0.446 |

CALCULATION SYSTEM, IMAGE FORMING APPARATUS, AND IMAGE FORMING SYSTEM

BACKGROUND OF THE DISCLOSURE

Field of the Disclosure

The present disclosure relates to a calculation system, an image forming apparatus, and an image forming system.

Description of the Related Art

Recently, the market for digital image forming apparatuses that can realize short delivery time without the need for form plate preparation and that can perform variable printing is expanding. In such a digital image forming apparatus, an electrophotographic method using a powder toner, an inkjet method using a fluid ink, and the like can be cited. In the electrophotographic method, a sheet is heated by a fixing device in order to fix the powder toner to the sheet. In the inkjet method, a sheet is heated by a drying unit in order to quickly dry the fluid ink on the sheet to improve productivity.

In image forming apparatuses, a type of sheet such as fine paper or coated paper is often used. The main raw material for these types of sheets is pulp fiber. The pulp fiber is made from wood and absorbs and releases water (moisture) well. As the pulp fibers expand and contract as moisture is absorbed and released, the size of a sheet changes. When the sheet is heated by the fixing device or the drying unit of the image forming apparatus, moisture contained in the pulp fibers of the sheet evaporates so that the size of the sheet contracts. Since the sheet contracted by heating absorbs moisture in the surrounding air, the size of the sheet expands as time passes. The amount of water (moisture content) contained in the sheet increases until it is in equilibrium with the saturated moisture content in the surrounding air.

On the other hand, the digital image forming apparatuses have come to be used in the commercial printing field as on-demand printing. In the commercial printing field, a sheet on which an image is formed by an image forming apparatus is often subjected to a post-processing such as a folding process, a cutting process, and a bookbinding process by a post-processing apparatus. When the post-processing apparatus performs the folding process or the cutting process on a sheet, a processing position is generally determined based on the sheet size with reference to the edge of the sheet. The sheet size includes a standard size and a non-fixed size. A user inputs sheet size information to the image forming apparatus in advance. The processing position is determined based on the input sheet size information. For example, when the user inputs the A3 size as the sheet size information, the sheet size is 420 mm in length in a sheet conveyance direction and 297 mm in length in a longitudinal direction (depth direction of the image forming apparatus) orthogonal to the conveyance direction. When the sheet is folded in half in the conveyance direction, a position 210 mm from a leading edge of the sheet is determined as the processing position, and the sheet is folded at the determined processing position.

However, when the sheet is heated and contracted, a sheet size when the folding process is performed is changed from a sheet size when the image is formed. That is, since the sheet size when the folding process is performed is changed from a sheet size inputted by the user, when the sheet is folded at a folding position determined from the inputted sheet size, a folded portion of the sheet may be shifted from a desired position. As a countermeasure against such expansion and contraction of the sheet, the sheet is left for about one day until the length of the sheet on which an image has been formed by the image forming apparatus settles to an equilibrium state, and then the sheet is subjected to post-processing by the post-processing apparatus offline. However, the digital image forming apparatus which does not require a form plate has a matter that an output of a final product is delayed by leaving the sheet for one day for post-processing, in spite of the merit of immediately outputting the sheet on which the image is formed by on-demand printing. Therefore, there is a need to address expansion and contraction of a sheet caused by heating while shortening the time from a start of image formation to an end of post-processing, without need to leave the sheet on which an image is formed.

Some digital image forming apparatuses can perform double-sided printing for forming images on both sides of a sheet. However, since the length of the sheet in the conveyance direction changes due to heating of the sheet when a front surface image is formed on a first side of the sheet, an image forming position of a back surface image formed on a second side opposite to the first side of the sheet may be shifted from an image forming position of the front surface image formed on the first side. Such relative displacement between the front surface image and the back surface image degrades a quality of a printed product, and causes a possibility of image chipping in the cutting process and image displacement in the bookbinding process.

Japanese Patent Application Laid-Open No. 2009-067560 relates to a paper post-processing device and an image forming device in which the length of the sheet to be post-processed is actually measured, and the processing position is adjusted based on the measured sheet length. However, even if the sheet length is actually measured, the sheet length continues to change until the moisture content (percentage of water content) of the sheet heated by the fixing device is saturated. If the sheet length is not measured immediately before the post-processing, the processing position deviates from the desired position of the sheet even if the processing position is adjusted based on the actually measured sheet length. That is, a sheet length detection unit is required for each post-processing step, which leads to an increase in the size and cost of the post-processing apparatus. In addition, since various post-processing apparatuses are manufactured by various manufacturers, it is difficult to provide sheet length detection units in all post-processing apparatuses. In a case in which the sheet length detection unit is provided in a main body of the image forming apparatus, the length of the sheet changes according to an elapsed time from a time when the length of the sheet is detected to a time when the post-processing is performed on the sheet, and therefore, there is a limit in improving the accuracy of the post-processing position.

Japanese Patent Application Laid-Open No. 2012-194361 relates to an information processor, an image forming device, and a program in which a main body of an image forming apparatus has moisture content information before and after heating and a correction value for calculating an expansion and contraction amount of a sheet for each sheet type, a sheet length change amount is calculated based on the moisture content information and the correction value, and an image forming position on a second side is corrected based on the sheet length change amount. However, even if the sheet length change amount is calculated immediately after fixing as in Japanese Patent Application Laid-Open No.

2009-067560, the sheet length continues to change with the lapse of time, so that the relative displacement between the front surface image and the back surface image cannot be reduced unless the sheet length change amount is calculated when the image is transferred to the second side. Also, even if the sheet length is measured when an image is transferred to the second side, the sheet length continues to change during the time required to calculate the sheet length change amount, feed forward the calculation result to an image forming portion, and form an image on the sheet, and the image formation cannot be performed for the amount of time required. As a result, the productivity is greatly reduced.

SUMMARY OF THE DISCLOSURE

According to an aspect of the present disclosure, a calculation system includes an obtaining unit configured to obtain information of a sheet, and a calculation unit configured to calculate an amount of change in length of the sheet in a conveyance direction of the sheet heated by a heating device to fix a toner image to the sheet based on the information of the sheet obtained by the obtaining unit and an elapsed time from a time when the sheet passes through the heating device.

Further features of the present disclosure will become apparent from the following description of exemplary embodiments with reference to the attached drawings.

DESCRIPTION OF THE EMBODIMENTS

The representative embodiments of the present disclosure will be described below. It should be noted that the embodiments described below are illustrative of the present disclosure, and the configurations, dimensions of components, materials, shapes, relative arrangements, and controls described below are not intended to limit the scope of the present disclosure unless otherwise specifically stated.

According to the embodiments, a sheet length change amount transition function is calculated by using information of a sheet. A sheet length change amount (sheet length change information) is calculated from the sheet length change amount transition function by using an elapsed time after heating of the sheet. The sheet length change amount is used for both correction of a processing position in a post-processing apparatus and correction of an image forming position on a second side of the sheet in double-sided printing. In the present embodiments, the correction of the processing position in the post-processing apparatus is described as an example, but the application of the sheet length change amount is not limited to this.

First Embodiment

[Image Forming System]

Figure 1:
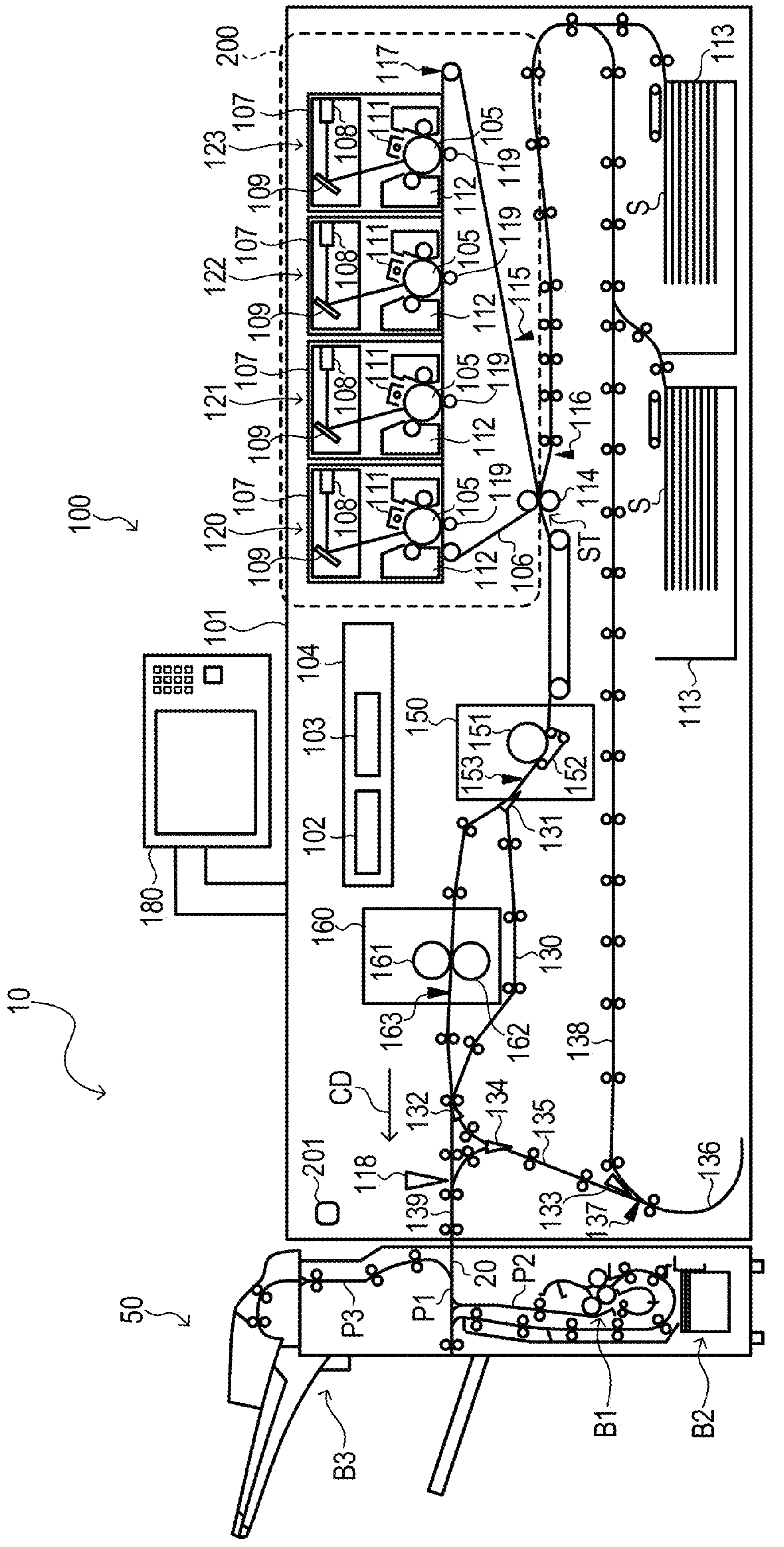
FIG. 1 is a cross-sectional view of an image forming system.

FIG. 1 is a cross-sectional view of an image forming system 10. The image forming system 10 includes an image forming apparatus (hereinafter referred to as printer 100) and a folding unit 50 as a post-processing apparatus. In FIG. 1, the folding unit 50 is physically connected to the printer 100. However, the folding unit 50 may be disposed at a distance away from the printer 100 and may be electrically connected to the printer 100 so as to be information-cooperatively connected to the printer 100. The folding unit 50 may also be connected to the printer 100 via another apparatus such as an inspection apparatus or another post-processing apparatus.

[Printer]

The printer 100 of the embodiment is an electrophotographic laser beam printer. Here, the printer 100 of an electrophotographic method will be described as an example. However, since other types of printers, such as inkjet printers and sublimation type printers, also have the same matter that a length of a sheet continues to change due to heating of the sheet, the embodiment applies to other types of printers. Therefore, the embodiment is applied to an electrophotographic printer and other printers.

As shown in FIG. 1, the printer 100 includes a main body (housing) 101. The main body 101 is provided with respective mechanisms for constituting an engine portion and a control board housing portion 104. The control board housing portion 104 houses an engine control unit 102 configured to perform a control relating to printing processes (for example, feeding process) performed by respective mechanisms and a printer controller 103.

As the respective mechanisms for constituting the engine portion, an image forming portion 200 configured to form a toner image to transfer the toner image to a sheet, a fixing process mechanism configured to fix the toner image transferred to the sheet, a sheet feeding process mechanism, and a sheet conveying process mechanism are provided. The image forming portion 200 scans a laser beam to form an electrostatic latent image on a photosensitive drum 105, develops the electrostatic latent image with toner to form a toner image, transfers the toner image to an intermediate transfer member 106, and transfers the toner image on the intermediate transfer member 106 to a sheet.

The image forming portion 200 is provided with four stations 120, 121, 122, and 123 corresponding to Y, M, C, and K. The stations 120, 121, 122, and 123 are image forming devices configured to transfer respective toner images to a sheet to form an image. Here, Y, M, C, and K are abbreviations of yellow, magenta, cyan, and black, respectively. The stations 120, 121, 122, and 123 are composed of substantially common components.

The image forming portion 200 has an optical process mechanism. The optical process mechanism has a laser scanner portion 107. The laser scanner portion 107 includes a semiconductor laser (light source) 108, a laser driver (not shown), a rotary polygon mirror (not shown), and a reflecting mirror 109. The laser driver (not shown) turns on/off a laser beam emitted from the semiconductor laser 108 according to image data outputted from the printer controller 103. The laser beam emitted from the semiconductor laser 108 is deflected in a main scanning direction by the rotary polygon mirror (not shown). The laser beam deflected in the main scanning direction is reflected by the reflecting mirror 109 to irradiate the photosensitive drum 105 to expose a surface of the photosensitive drum 105 in the main scanning direction.

The photosensitive drum 105 as an image bearing member is rotatable. A primary charger 111 uniformly charges the surface of the photosensitive drum 105. The laser scanner portion 107 irradiates the uniformly charged surface of the photosensitive drum 105 with the laser beam to form the electrostatic latent image on the surface of the photosensitive drum 105. A developing device 112 develops the electrostatic latent image with toner as a developer to form a toner image. A primary transfer roller 119 is applied with a voltage having a polarity opposite to a polarity of the toner image, and transfers the toner image on the photosensitive drum 105 to the intermediate transfer member 106 (primary transfer). When a color image is to be formed, a yellow toner image, a magenta toner image, a cyan toner image, and a black toner image are formed by the stations 120, 121, 122, and 123, respectively, and sequentially transferred onto the intermediate transfer member 106. As a result, a full-color toner image is formed on the intermediate transfer member 106.

A storage 113 configured to store sheets S is provided in a lower portion of the printer 100. The sheet S is conveyed from the storage 113 to a transfer roller 114 by the feeding process mechanism. The transfer roller 114 is pressure-contacted with the intermediate transfer member 106, and a bias having the polarity opposite to the polarity of the toner is applied to the transfer roller 114. The transfer roller 114 pressure-contacts the sheet with the intermediate transfer member 106, and transfers the full-color toner image to the sheet conveyed in a sub-scanning direction by the feeding process mechanism (secondary transfer). The photosensitive drum 105 and the developing device 112 can be attached to and detached from the main body 101 of the printer 100.

An image formation start position sensor 115, a feeding timing sensor 116, and a density sensor 117 are disposed around the intermediate transfer member 106. The image formation start position sensor 115 outputs a detection signal for determining a print start position at the time of image formation. The feeding timing sensor 116 detects a leading edge of the sheet and outputs a detection signal for determining a timing for feeding the sheet to a secondary transfer portion ST. The density sensor 117 detects a density of each patch formed on the intermediate transfer member 106 during a density control.

The leading edge of the sheet conveyed at a conveyance speed faster than a speed of the intermediate transfer member 106 in the secondary transfer portion ST in order to increase the number of sheets printed per unit time is detected by the feeding timing sensor 116. Thereafter, the conveyance speed of the sheet is reduced after a predetermined time, and shifted to the conveyance speed at the time of transfer in the secondary transfer portion ST. At this time, if a deceleration timing is delayed, the arrival of the sheet to the secondary transfer portion ST is accelerated, and if the deceleration timing is accelerated, the arrival of the sheet to the secondary transfer portion ST is delayed. By the fine adjustment of the deceleration timing, the leading edge of the sheet coincides with a leading edge of the toner image on the intermediate transfer member 106 at the secondary transfer portion ST. A thickness of the sheet is detected by a sheet thickness sensor (not shown), and a conveyance path interval between guide surfaces provided with the feeding timing sensor 116 is determined.

The fixing process mechanism has a first fixing device (heating device) 150 and a second fixing device (heating device) 160 configured to heat and pressurize the toner image transferred to the sheet to fix the toner image to the sheet. The first fixing device 150 includes a fixing roller 151 configured to heat the sheet, a pressure belt 152 configured to bring the sheet into pressure contact with the fixing roller 151, and a sheet sensor (first post-fixing sensor) 153 configured to detect a completion of the fixing. The fixing roller 151 is a hollow roller and has a heater inside. The fixing roller 151 and the pressure belt 152 are configured to be rotated to convey the sheet. The second fixing device 160 is disposed downstream of the first fixing device 150 in the conveyance direction of the sheet. The second fixing device 160 is provided for the purpose of adding a gloss to the toner image on the sheet fixed by the first fixing device 150 and securing fixability. Like the first fixing device 150, the second fixing device 160 also includes a fixing roller 161, a pressure roller 162, and a sheet sensor (second post-fixing sensor) 163.

Depending on the type of the sheet, it may not be necessary to pass the sheet through the second fixing device 160. In this case, the sheet is passed through a conveyance path 130 without passing through the second fixing device 160 for the purpose of reducing energy consumption. A conveyance path switching flapper 131 switches between conveying the sheet to the conveyance path 130 and conveying the sheet to the second fixing device 160.

A conveyance path switching flapper 132 switches between conveying the sheet to a conveyance path 135 and conveying the sheet to a discharge path 139. The conveyance path 135 is provided with a surface reverse sensor 137. The leading edge of the sheet passes through the surface reverse sensor 137 and is conveyed to a reverse portion 136. When the surface reverse sensor 137 detects a trailing edge of the sheet S, the sheet conveyance direction is switched. A conveyance path switching flapper 133 switches between conveying the sheet to a conveyance path 138 for the double-sided image formation and conveying the sheet to the conveyance path 135. A conveyance path switching flapper 134 is a guide member configured to guide the sheet to the discharge path 139. After the position of the sheet is detected by the surface reverse sensor 137, the leading edge and the trailing edge of the sheet are switched by performing a switchback operation at the reverse portion 136. The sheet is conveyed from the discharge path 139 to the folding unit 50 as the post-processing apparatus.

An environmental sensor 201 is disposed within the main body 101 of the printer 100. The environmental sensor 201 detects a temperature and humidity inside the main body 101. In the present embodiment, the environmental sensor 201 is disposed inside the main body 101, but may be disposed outside the main body 101 as long as the environmental sensor 201 can appropriately detect the temperature and humidity (for example, relative humidity) of the air (atmosphere) to which the sheet is exposed.

[Post-Processing Apparatus]

In the embodiment, a post-processing method will be described using the folding unit 50 as a folding process apparatus configured to fold a sheet. In the embodiment, a sheet folding process in which a folding process position (processing position) is changed according to a sheet length change amount will be described. However, with respect to the point of changing the processing position according to the sheet length change amount, there is the similar matter in other post-processing apparatuses other than the folding unit 50, for example, a bookbinding apparatus, a saddle stitching apparatus, a cutting apparatus, a laser cutting apparatus, a foil stamping apparatus, a varnish coating apparatus, and a creasing apparatus. Therefore, the matter in the other post-processing apparatus can be addressed by using the method described below. Therefore, the present embodiment can be applied to other post-processing apparatuses other than the folding unit 50.

In the embodiment, a sheet folding method using rollers will be described. However, with respect to the point of changing the processing position according to the sheet length change amount, there is the similar matter in other sheet folding methods other than the sheet folding method using the rollers, for example, a method of performing the folding process by extruding an arbitrary folding position with a pin such as a needle. Therefore, the matter in the sheet folding method using the pin can also be addressed by using the method described below. Therefore, the present embodiment can be applied to other sheet folding methods other than the sheet folding method using the rollers.

[Folding Unit]

Figure 2:
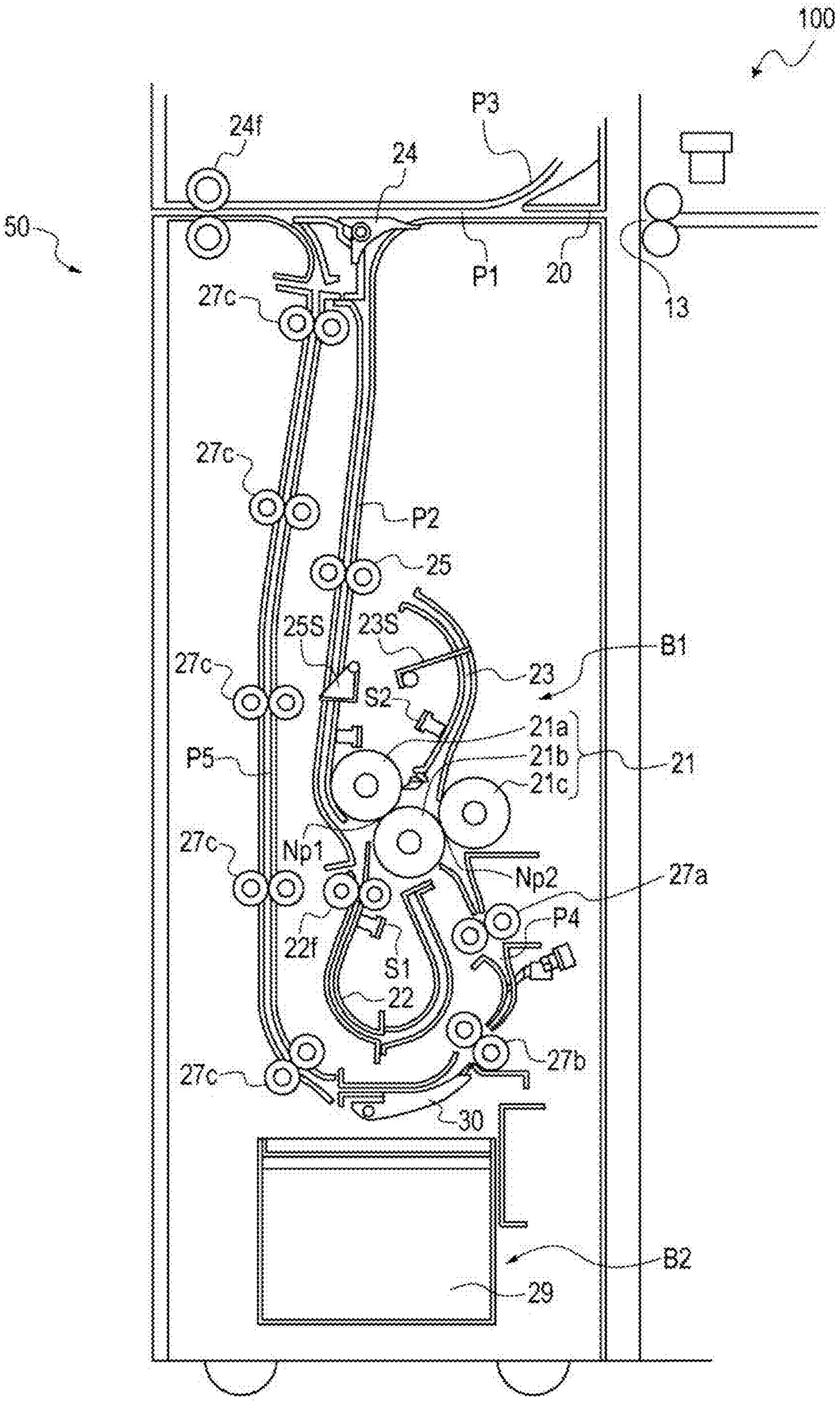
FIG. 2 is a cross-sectional view of a folding process portion and a folded sheet stacking portion of a folding unit.

As shown in FIG. 1, the folding unit 50 includes a folding process portion B1, a folded sheet stacking portion B2, and an inserter device B3. FIG. 2 is a cross-sectional view of the folding process portion B1 and the folded sheet stacking portion B2 of the folding unit 50. The folding unit 50 is provided with a carry-in port 20 connected to a discharge port 13 of the printer (image forming unit) 100. The folding unit 50 is provided with a sheet carry-in path P1, through which a sheet is conveyed from the carry-in port 20 to a bookbinding process unit (not shown) disposed downstream of the folding unit 50, the sheet carry-in path P1 traversing the folding unit 50. A folding process path P2 is branched from the sheet carry-in path P1. A feeding path P3 from the inserter device B3 is joined to the sheet carry-in path P1.

[Description of Sheet Folding Specifications]

Sheet folding specifications performed by the folding process portion B1 will be described with reference to FIG. 3A, FIG. 3B, FIG. 3C, FIG. 3D, FIG. 3E, and FIG. 3F are explanatory views of the sheet folding specifications. The sheet folding specifications (sheet folding forms) implemented by the image forming system 10 includes a half-fold, a tri-fold, and a Z-fold. The sheet folding specifications will be described below.

(Half-Fold)

When the sheet is folded in two, the folding process portion B1 sets the position of approximately ½ of the length of the sheet conveyed from the printer 100 in the conveyance direction to the folding process position as a crease. Although not shown, the sheet is folded in two at the ½ position leaving a binding margin at the center or spine of the sheet. The spine edge of the folded sheet is stapled or glued by the bookbinding unit (not shown). As described above, the half-hold is used for various document arrangement such as a traditional Chinese bookbinding document or a document filed by punching half-folded sheets.

(Tri-Fold)

Figure 3A:
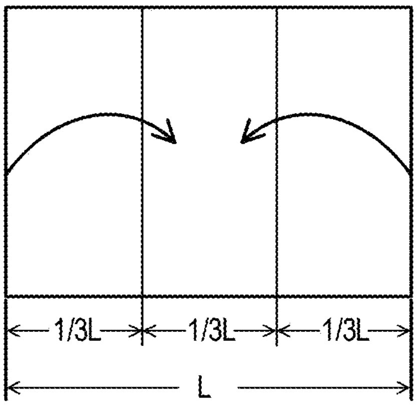
FIG. 3A, FIG. 3B, FIG. 3C, FIG. 3D, FIG. 3E, and FIG. 3F are explanatory views of sheet folding specifications.
Figure 3B:
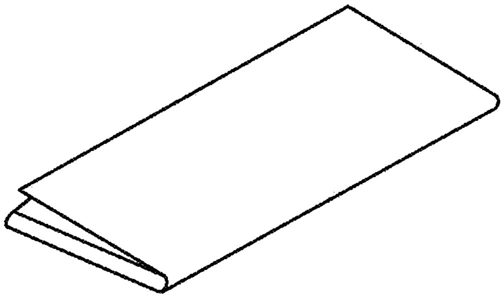

In the case of the tri-fold, the sheet conveyed from the printer 100 is divided into three at two desired positions. FIG. 3A is a view showing an example in which a sheet of length L is divided into three equal portions in the conveyance direction. One end of the sheet is valley-folded at a first position toward the other end, the other end is valley-folded at a second position toward the one end, and the folded portions are alternately superposed. FIG. 3B is a perspective view of a tri-folded sheet. The sheet is valley-folded toward the right at a position of ⅓ L from the left end, and the right panel valley-folded toward the left at a position of ⅓ L from the right end is superposed on the folded left panel. The tri-fold is suitable for enclosing a sheet in an envelope as a letter-fold.

(Z-Fold)

Figure 3C:
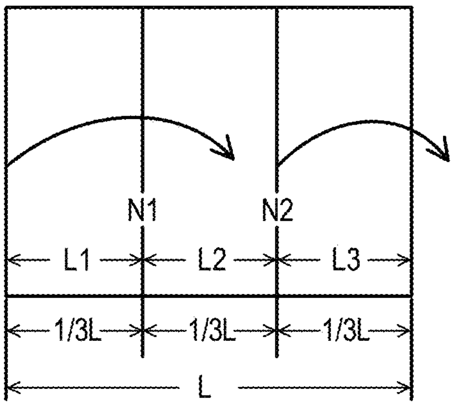
Figure 3D:
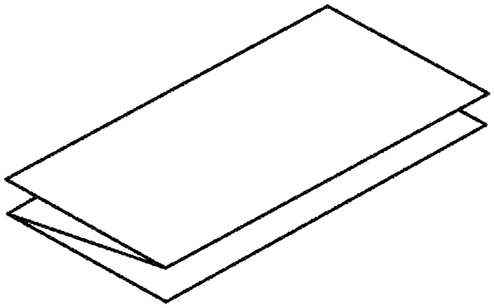

In the case of the Z-fold, the sheet conveyed from the printer 100 is divided into three at two desired positions. FIG. 3C is a view showing an example in which a sheet of length L is divided into three equal portions in the conveyance direction. The sheet is valley-folded toward the right at a position N1 of ⅓ L from the left end, and a left panel L1 is superposed on a center panel L2. At a position N2 of ⅓ L from the right end, the right end of the sheet is mountain-folded toward the left at the back side of the sheet, and the right panel L3 is superposed on the back side of the center panel L2. In this manner, the left panel L1 of the sheet is folded inward, and the right panel L3 of the sheet is folded outward to form a Z-shape. FIG. 3D is a perspective view of a Z-folded sheet in three equally spaced positions. The Z-fold shown in FIG. 3D is suitable for enclosing the sheet in an envelope as a letter-fold.

Figure 3E:
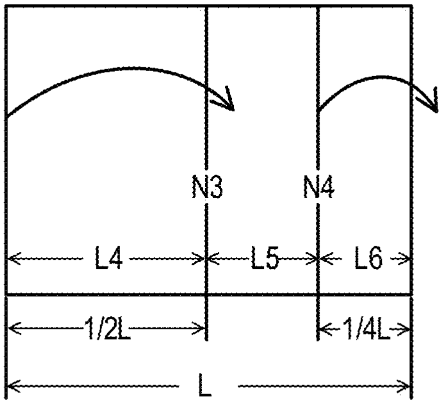
Figure 3F:
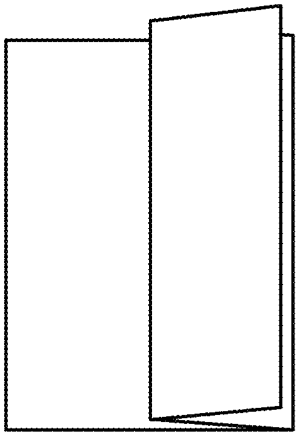

FIG. 3E shows an example in which a sheet of length L in the conveyance direction is divided at a position N3 of ½ L from the left end and a position N4 of ¼ L from the right end. The sheet is valley-folded at the position N3 of ½ L from the left end so that the left end of the sheet is turned toward the right, and the left panel L4 is superposed on the center panel L5. The sheet is mountain-folded at the position N4 of ¼ L from the right end so that the right end of the sheet is turned toward the left, and the right panel L6 is superposed on the back side of the center panel L5. In this way, the left panel L4 of the sheet is folded inward, and the right panel L6 of the sheet is folded outward to form a Z-shape. FIG. 3F is a perspective view of a Z-folded sheet folded at the position N3 and the position N4 shown in FIG. 3E. The Z-fold shown in FIG. 3F is suitable for filing sheets.

It should be noted that the sheet-folding suitable for various applications can be performed by appropriately adjusting the inward folding position (the position N1 in FIG. 3C and the position N3 in FIG. 3E) and the outward folding position (the position N2 in FIG. 3C and the position N4 in FIG. 3E) at the time of Z-folding. For example, if the position N1 (inward folding position) is set to ⅓ L while leaving a binding margin at the spine edge, the bookbinding can be performed. By adjusting the position N2 (outward folding position) folded on the side of the fore edge, a part of the folded panel can be projected to the outside of the folded sheet as a heading part. That is, if the position N2 is adjusted so that the condition of the center panel L2<the right panel L3 is established in FIG. 3C, or the position N4 is adjusted so that the condition of the center panel L5<the right panel L6 is established in FIG. 3E, a part of the folded panel can be projected to the outside of the folded sheet as a heading part. Also, the position N2 is adjusted so that the condition of the center panel L2>the right panel L3 is established in FIG. 3C, or the position N4 is adjusted so that the condition of the center panel L5>the right panel L6 is established in FIG. 3E, the folded panel can be retreated inward of the folded sheet.

[Basic Operation of Folding Process]

Figure 4A:
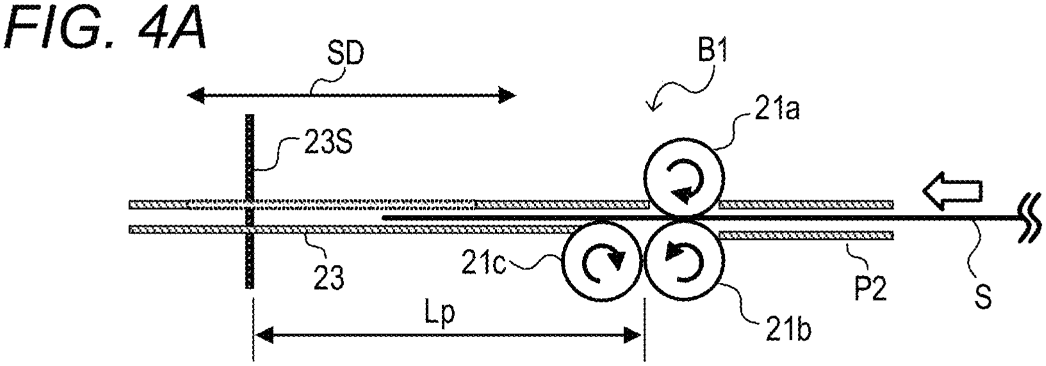
FIG. 4A, FIG. 4B, FIG. 4C, and FIG. 4D are explanatory views sequentially showing behaviors of a sheet when the sheet is folded in a folding position.

Next, a basic operation for mechanically performing the folding process will be described with reference to FIG. 4A, FIG. 4B, FIG. 4C, and FIG. 4D. FIG. 4A, FIG. 4B, FIG. 4C, and FIG. 4D are explanatory views sequentially showing behaviors of a sheet S when the sheet S is folded at a folding position (processing position) Lp. In the present embodiment, the folding process path P2 and a folding sheet path 23 in the folding process portion B1 are curved, but in FIG. 4A, FIG. 4B, FIG. 4C, and FIG. 4D, the folding process path P2 and the folding sheet path 23 are shown in a straight line for explanation. FIG. 4A is a view showing the sheet S conveyed to the folding process portion B1. The sheet S is nipped and conveyed by a first roll 21*a* and a second roll 21*b*. The folding process portion B1 has a movable stopper 23S in the folding sheet path 23. The movable stopper 23S is movable along the folding sheet path 23 in a direction SD indicated by the double-headed arrow so as to change the folding position Lp of the sheet S. As shown in FIG. 4A, the folding position Lp represents a distance from the movable stopper 23S to a nip point between the second roll 21*b* and a third roll 21*c*.

Figure 4B:
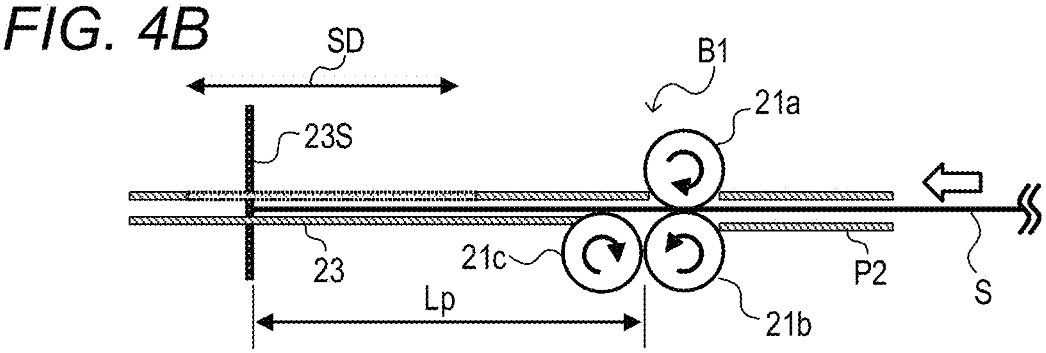
Figure 4C:
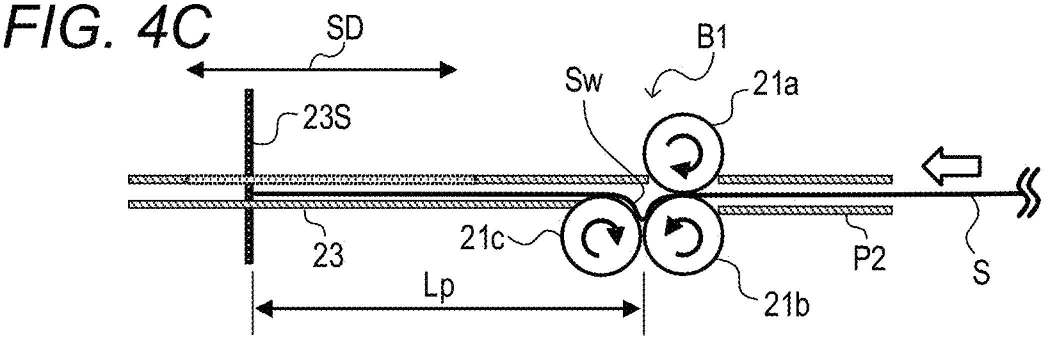

FIG. 4B is a view showing the sheet S in which the folding position is determined by the leading edge of the sheet S abutting against the movable stopper 23S. The leading edge of the sheet S is regulated by the movable stopper 23S so that the sheet S is conveyed no more. FIG. 4C is a view showing the sheet S when the sheet S of which the leading edge is regulated by the movable stopper 23S is continuously conveyed by the first roll 21*a* and the second roll 21*b*. Since the leading edge of the sheet S is regulated by the movable stopper 23S, the sheet S continuously conveyed is curved. A curved portion Sw of the sheet S becomes larger toward the nip point between the second roll 21*b* and the third roll 21*c*.

Figure 4D:
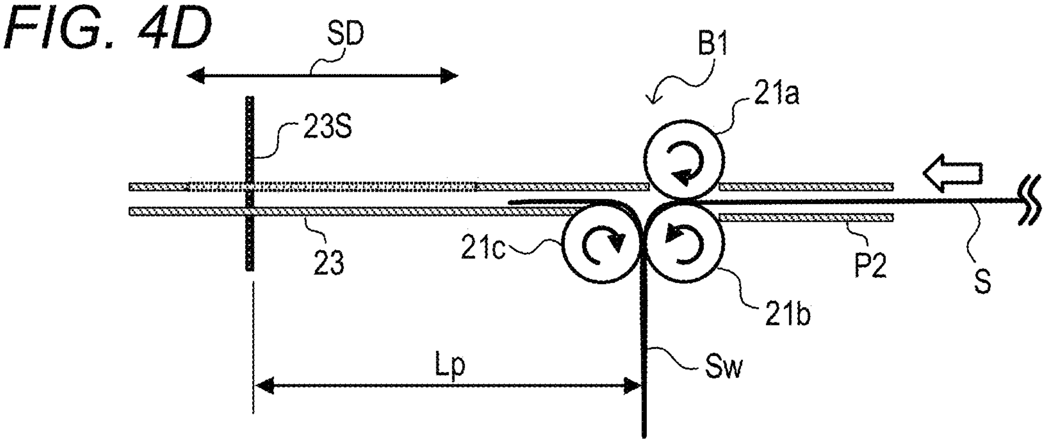

When the curved portion Sw formed in the sheet S becomes a predetermined magnitude or larger, the sheet S is nipped in a state in which the sheet S is folded into the nip between the second roll 21*b* and the third roll 21*c*, and is started to be conveyed. FIG. 4D is a view showing the sheet S when the sheet S starts to be conveyed with the curved portion Sw of the sheet S being nipped by the second roll 21*b* and the third roll 21*c*. By changing the position of the movable stopper 23S, the sheet S can be folded at an arbitrary position.

[Configuration of Folding Process Portion]

The structure of the folding process portion B1 will be described below based on the above described sheet folding specifications and basic operation of the folding process. As shown in FIG. 2, the folding process path P2 is branched from the sheet carry-in path P1 via a path switching flapper 24. A folding roll mechanism 21 is disposed in the folding process path P2. The folding sheet path 23 is branched in a T-shape from the folding process path P2. A switchback path 22 is provided downstream of the folding process path P2 from a branch point of the folding sheet path 23. The folding roll mechanism 21 is disposed at the branch point where the folding sheet path 23 branches from the folding process path P2.

The folding roll mechanism 21 includes the first roll 21*a*, the second roll 21*b*, and the third roll 21*c*. The first roll 21*a* and the second roll 21*b* are in contact with each other so that the sheet can be nipped by the first roll 21*a* and the second roll 21*b*. The second roll 21*b* and the third roll 21*c* are in contact with each other so that the sheet can be nipped by the second roll 21*b* and the third roll 21*c*. A first folding process for folding the sheet is performed at the nip point Np1 (first folding portion) between the first roll 21*a* and the second roll 21*b*. A second folding process for folding the sheet is performed at the nip point Np2 (second folding portion) between the second roll 21*b* and the third roll 21*c*.

A conveyance roller 25 configured to convey the sheet is disposed in the folding process path P2. The folding roll mechanism 21 is disposed downstream of the conveyance roller 25. A switchback roller 22*f* which is forward and reverse rotatable and a sheet sensor S1 are disposed on the switchback path 22 disposed downstream of the folding process path P2. The sheet sensor S1 is disposed downstream of the switchback roller 22*f*. When the sheet is conveyed by a predetermined amount from a time when the sheet sensor S1 detects the leading edge of the sheet conveyed by the forward rotation of the switchback roller 22*f*, the switchback roller 22*f* is stopped. Thereafter, as the conveyance roller 25 conveys the trailing edge side of the sheet, the sheet is curved at the folding position. The curved portion of the sheet is nipped by the nip point Np1 (first folding portion) between the first roll 21*a* and the second roll 21*b* of the folding roll mechanism 21. Thereafter, the switchback roller 22*f* is reversed to back the leading edge side of the sheet, and the leading edge side of the sheet is conveyed to the nip point Np1 together with the trailing edge side of the sheet conveyed by the conveyance roller 25. The curved portion of the sheet is nipped by the nip point Np1 between the first roll 21*a* and the second roll 21*b*, and conveyed to the folding sheet path 23.

The folding process path P2 is provided with a stopper member 25S downstream of the conveyance roller 25. The stopper member 25S constitutes a seat stopper mechanism (trailing edge regulating stopper). The stopper member 25S is configured as a flapper capable of taking an entry position to enter the folding process path P2 and a retracted position to be retracted from the folding process path P2. When the leading edge of the sheet conveyed by the conveyance roller 25 pushes the stopper member 25S, the stopper member 25S moves to the retracted position to be retracted from the folding process path P2. When the sheet passes through the stopper member 25S, the stopper member 25S moves to the entry position to enter the folding process path P2. Thereafter, when the sheet is conveyed in the opposite direction by the reverse rotation of the switchback roller 22*f*, the trailing edge of the sheet abuts against the stopper member 25S located at the entry position so that the movement of the trailing edge of the sheet is restricted.

In a case in which the folding position of the sheet is determined with reference to the trailing edge of the sheet, the trailing edge of the sheet passes through the stopper member 25S by the forward rotation of the switchback roller 22*f*, and then the trailing edge of the sheet is brought into contact with the stopper member 25S by the reverse rotation of the switchback roller 22*f*. Thereafter, the leading edge of the sheet is backed by the reverse rotation of the switchback roller 22*f*, and the sheet is curved at the folding position with reference to the position of the stopper member 25S. The curved portion of the sheet is nipped by the nip point Np1 (first folding portion) between the first roll 21*a* and the second roll 21*b*, and conveyed to the folding sheet path 23.

Thus, the sheet is subjected to the first folding process at the folding position with reference to the trailing edge portion of the sheet.

Although the stopper member 25S is provided as the sheet stopper mechanism in the present embodiment, a pair of stopper rollers which are forward and reverse rotatable may be provided as the sheet stopper mechanism instead of the stopper member 25S. In this case, a stopper sheet sensor is provided upstream of the pair of stopper rollers. When the sheet is conveyed by a predetermined amount from a time when the stopper sheet sensor detects the trailing edge of the sheet conveyed in the opposite direction by the reverse rotation of the pair of stopper rollers, the pair of stopper rollers are stopped. This restricts the position of the trailing edge of the seat.

As described above, the folding position is determined with reference to the leading edge of the sheet or the trailing edge of the sheet, and the curved portion of the sheet curved at the folding position is nipped by the nip point Np1 (first folding portion) between the first roll 21*a* and the second roll 21*b*. The curved portion of the sheet is folded by the first roll 21*a* and the second roll 21*b* and conveyed to the folding sheet path 23. A sheet sensor S2 and the movable stopper 23S are disposed on the folding sheet path 23. The movable stopper 23S is configured to be movable within the folding sheet path 23 to regulate the position of the leading edge of the sheet or the position of the folded portion of the folded sheet according to the sheet size and the sheet folding specifications. The leading edge, i.e., the folded portion of the folded sheet conveyed by the first roll 21*a* and the second roll 21*b* comes into contact with the movable stopper 23S. As the trailing edge side of the folded sheet is conveyed by the first roll 21*a* and the second roll 21*b*, the folded sheet is curved. A curved portion of the folded sheet enters the nip point Np2 (second folding portion) between the second roll 21*b* and the third roll 21*c*, and the curved portion on the trailing edge side of the sheet is folded. A first discharge path P4 is disposed downstream of the nip point Np2 (second folding portion) between the second roll 21*b* and the third roll 21*c*. The sheet folded at the first folding portion and the second folding portion is conveyed to the first discharge path P4. In a case in which it is not necessary to fold the sheet twice, for example, as in the case of the half-fold, the movable stopper 23S is retracted to a non-operating position, and the sheet is conveyed to the first discharge path P4 without folding the sheet at the nip point Np2 between the second roll 21*b* and the third roll 21*c*.

The first discharge path P4 is provided with a pair of carry-out rollers 27*a* and a pair of carry-out rollers 27*b*. The pair of carrying-out rollers 27*a* nip the folded sheet and convey the folded sheet to a downstream side. On the downstream side of the first discharge path P4, a folded sheet storage stacker 29 and a second discharge path P5 are disposed via a path switching piece 30. In the second discharge path P5, a plurality of pairs of conveyance rollers 27*c* are disposed at appropriate intervals so as to convey the folded sheet to the sheet carry-in path P1. The sheet carry-in path P1 is provided with a pair of discharge rollers 24*f* downstream of a merging portion of the second discharge path P5 and the sheet carry-in path P1.

[About Expansion and Contraction of Sheet]

The sheets mainly used in the printing industry are a type of paper classified as printing sheets and made from pulp fibers. In the atmosphere, the sheet will behave so as to fall into an equilibrium state with the moisture content in the environment. That is, in a case in which the moisture content in the surrounding air is greater than the moisture content in the pulp fibers, the fibers gradually absorb the moisture and expand. Conversely, in a case in which the moisture content in the surrounding air is less than the moisture content in the pulp fibers, the fibers gradually release the moisture and contract. Since the sheet is made of intertwined pulp fibers, the pulp fibers expand (absorb the moisture) to increase the sheet size, and the pulp fibers contract (release the moisture) to decrease the sheet size.

In the image formation by the electrophotographic method, a toner image is transferred onto a sheet in the transfer step, and the toner image is heated and pressurized in the fixing step to fuse toner so that the toner is entangled in the fibers of the sheet and fixed to form an image on the sheet. In the fixing step, the toner is heated, and the sheet is heated together with the toner.

Figure 5A:
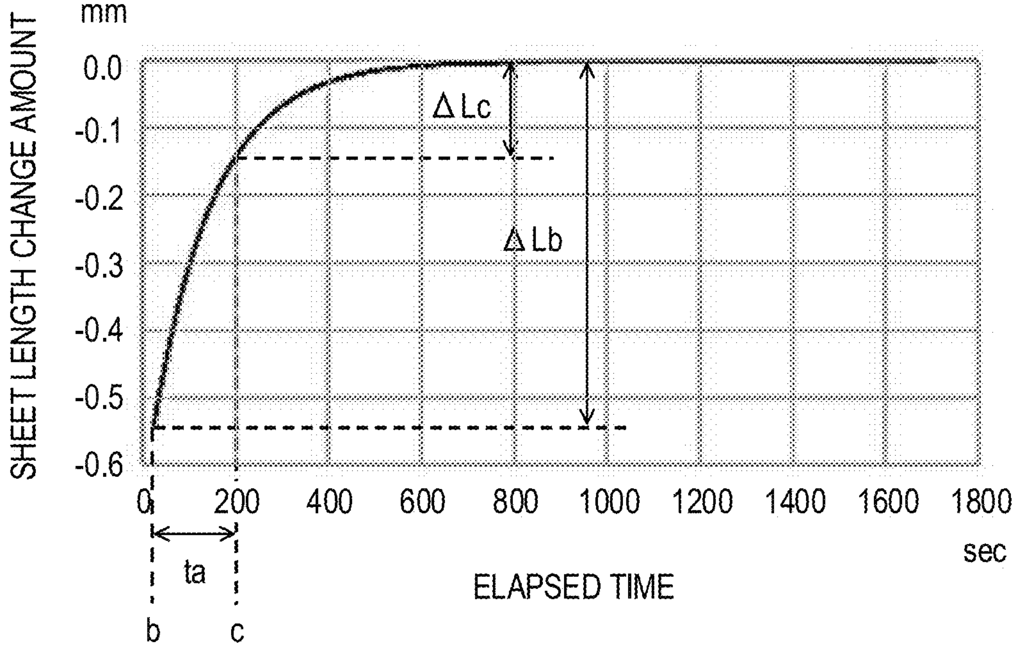
FIG. 5A, FIG. 5B, FIG. 5C, FIG. 5D, and FIG. 5E are explanatory views of the expansion and contraction of the sheet.

FIG. 5A, FIG. 5B, FIG. 5C, FIG. 5D, and FIG. 5E are explanatory views of an expansion and contraction of a sheet. FIG. 5A is a view showing a sheet length change amount with respect to an elapsed time "t" after the fixing step in the image formation by the electrophotographic method. The elapsed time "t" when the sheet passes through the fixing step is set to 0 (t=0). In the fixing step, the moisture contained in the sheet is heated together with the sheet, and the moisture contained in the pulp fibers is evaporated and released from the sheet, and the sheet is rapidly contracted. FIG. 5A shows the sheet length change amount when the elapsed time "t" immediately after the fixing step is "b" (t=b). Thereafter, as the sheet absorbs moisture in the surrounding atmosphere, the sheet size increases with the lapse of time, and the sheet size returns to the sheet size before the fixing step. Immediately after the fixing step, the sheet rapidly absorbs moisture, so that the sheet length changes rapidly. The change in the sheet length becomes gradual with the lapse of time, and the sheet size changes until the moisture content (percentage of water content) of the sheet is in equilibrium with the moisture content in the atmosphere. If a storage state of the sheet before the fixing step and a storage state of the sheet after the fixing step are the same environmental state, the sheet returns to its original size after a sufficient time elapses after the fixing step.

Figure 5B:
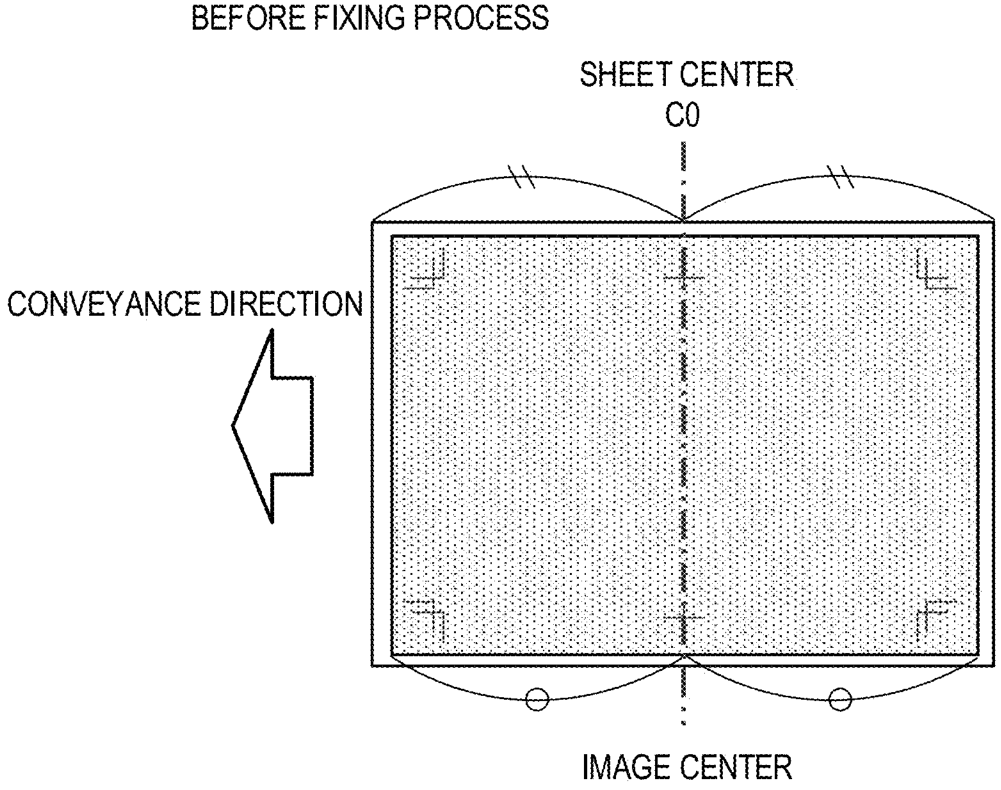

As shown in FIG. 5B, the center position of the sheet and the center position of the image coincide with each other if the image is formed at the correct position on the sheet before the toner image is transferred and the sheet passes through the fixing step. The center position before the change in the sheet length is set to CO.

Figure 5C:
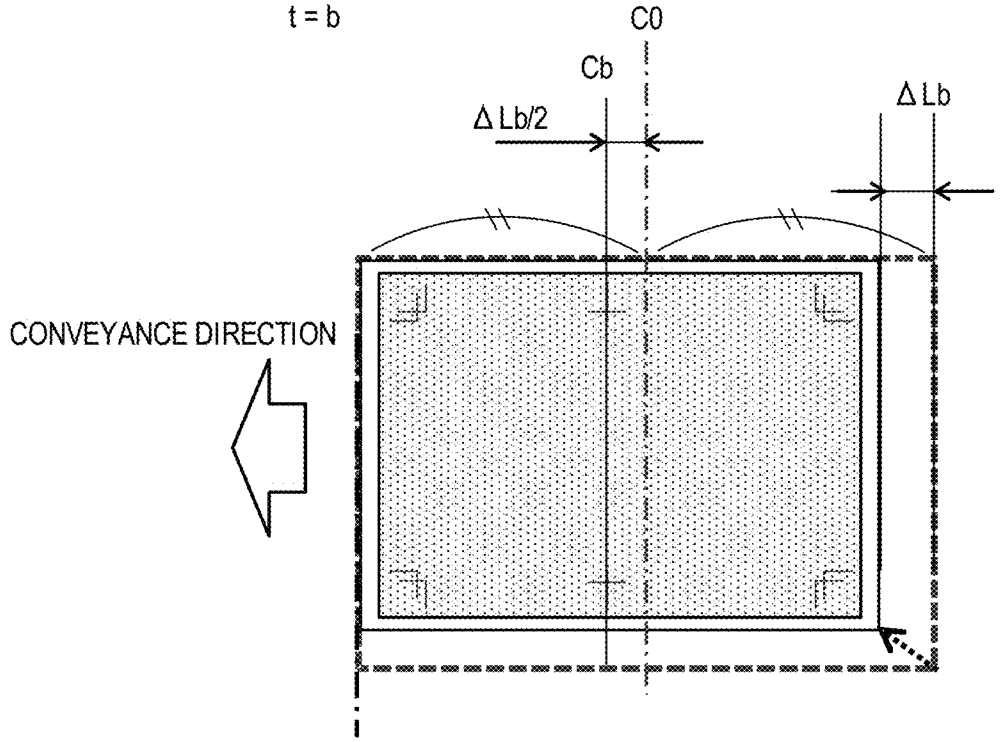

FIG. 5C shows a sheet having a sheet size when the elapsed time "t" immediately after the fixing step is "b" (t=b). Compared with the sheet size before passing through the fixing step, the sheet size when the elapsed time "t" immediately after passing through the fixing step is "b" (t=b) is contracted by ΔLb in the conveyance direction. Therefore, when the elapsed time "t" immediately after the fixing step is "b" (t=b), the center position Cb of the sheet is shifted from the center position CO of the sheet before passing through the fixing step by ΔLb/2.

Figure 5D:
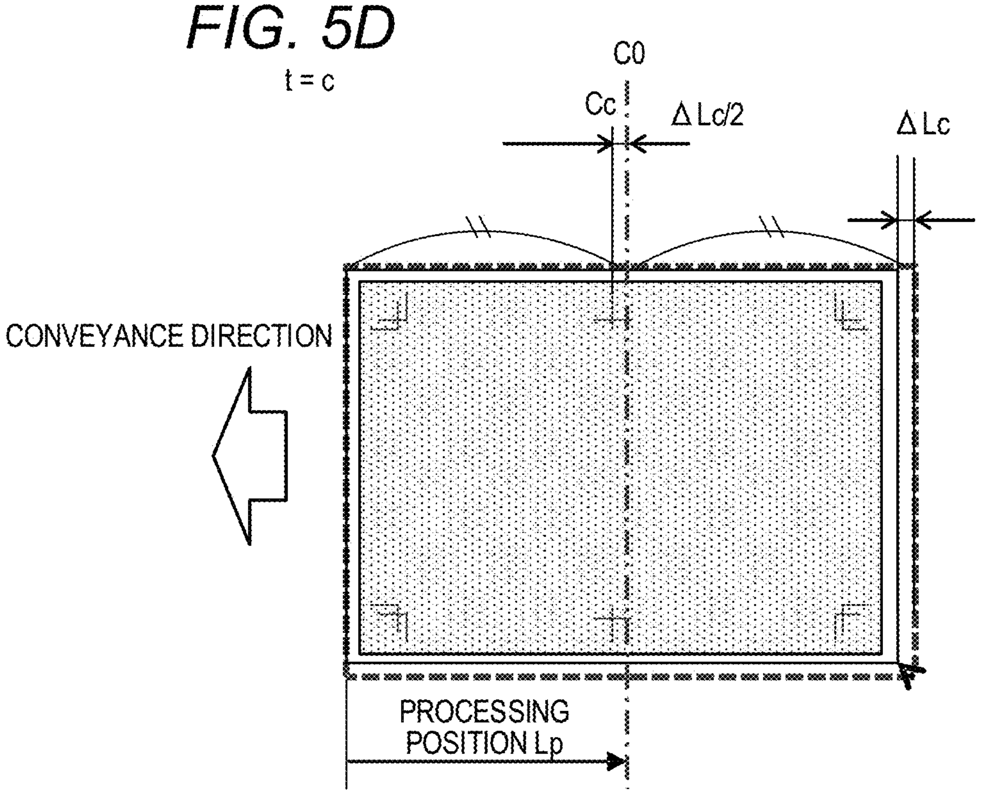

Thereafter, as shown in FIG. 5D, the sheet size when the elapsed time "t" is "c" (t=c) is contracted by the sheet length change amount ΔLc in the conveyance direction as compared with the sheet size before passing through the fixing step. However, the sheet size when the elapsed time "t" is "c" (t=c) is larger than the sheet size when the elapsed time "t" is "b" (t=b). The center position Cc of the sheet when the elapsed time "t" immediately after the fixing step is "c" (t=c) is shifted from the center position CO of the sheet before passing through the fixing step by ΔLc/2. As described above, with the elapsed time "t" after passing through the fixing step, the center position of the image changes with the change of the sheet size.

[Displacement of Folding Position]

As described above, after the fixing step, the sheet size is rapidly contracted and the amount of change is increased, but as time passes, the sheet size gradually returns to the original sheet size and the amount of change is decreased. This change in sheet length causes a displacement in the folding position (displacement in the processing position) when a post-processing such as the folding step is performed on the sheet on which an image has been formed by the printer 100.

For example, in a case in which the sheet is folded by the folding process portion B1 described above using FIG. 4A, FIG. 4B, FIG. 4C, and FIG. 4D in order to perform a saddle stitching on the sheet by the saddle stitching apparatus as the post-processing apparatus, the folding process portion B1 determines the folding position according to the sheet size with reference to the leading edge of the sheet. In the case of saddle stitching, the sheet is bisected and folded at the center position of the sheet in the conveyance direction. For example, in a case in which the sheet is folded when the elapsed time "t" is "c" (t=c), the sheet is bisected and folded at the center position Cc shown in FIG. 5D.

Figure 5E:
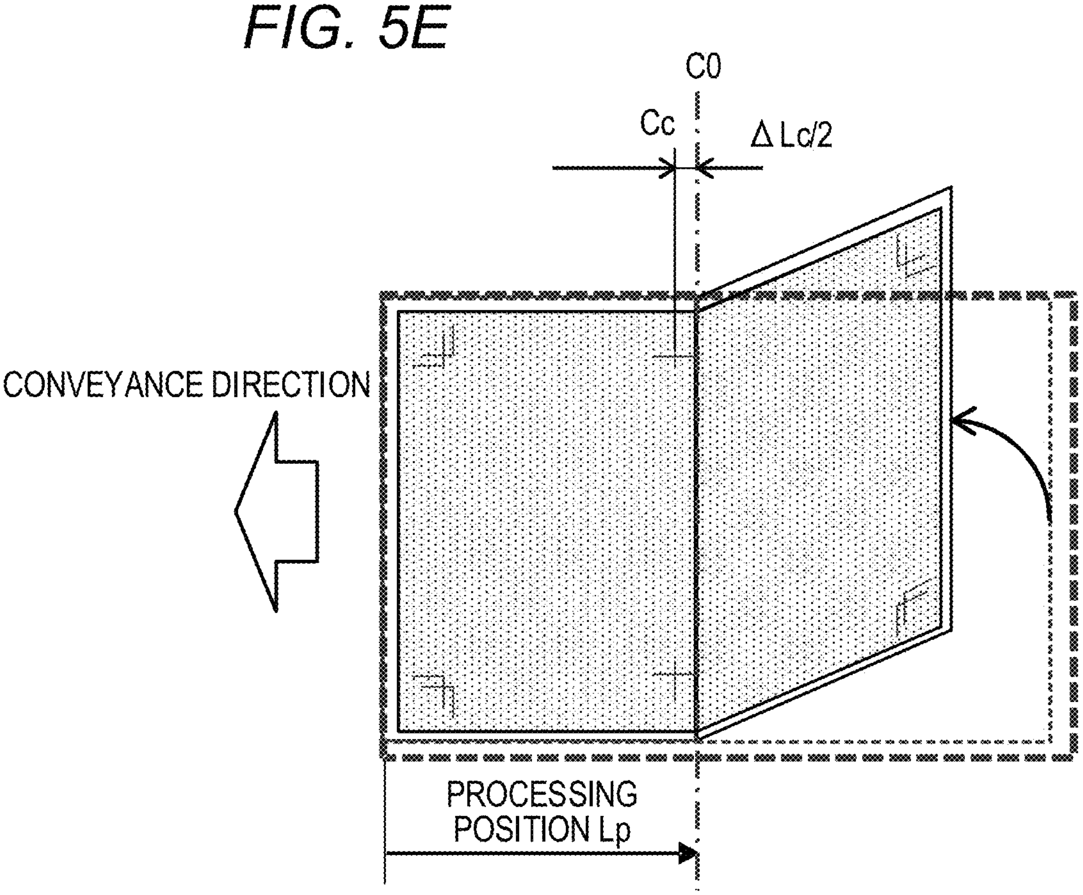

However, if the folding position is determined according to the initial sheet size before the fixing step and the folding process is performed when the elapsed time "t" after the fixing step is "c" (t=c), the folding position is shifted from the center of the image by ΔLc/2 as shown in FIG. 5E. For example, in a case in which a sheet having a length of 420 mm in the conveyance direction is folded in half, the folding position is determined to be 210 mm from the leading edge. However, in a case in which the sheet size is contracted after the fixing step so that the length in the conveyance direction is shortened by 1 mm to be 419 mm, the correct folding position is a position of 209.5 mm from the leading edge. In this case, the folding position is shifted from the center of the image by 0.5 mm.

The smaller the elapsed time "t" after the fixing step is, the smaller the amount by which the sheet contracted by the fixing step returns to the initial sheet size, so that the amount of displacement of the folding position relative to the center of the image increases. That is, in a case in which the folding unit 50 is connected in-line to the printer 100, the amount of displacement of the folding position is more likely to be larger than a case in which the folding unit 50 is separated from the printer 100. Such a displacement in the folding position is easily noticeable, especially in the case of bookbinding sheets. In the case of the saddle-stitching finish, an image displacement between pages or a gap formed in an image forming portion bridging pages of facing pages causes the deterioration in the quality of the printed product.

[Media Difference]

Figure 6A:
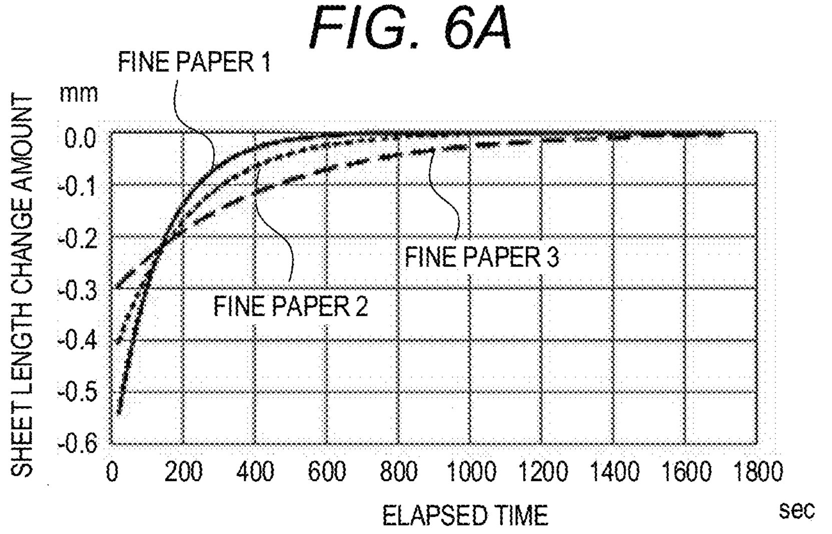
FIG. 6A, FIG. 6B, and FIG. 6C are views each showing a sheet length change amount with respect to an elapsed time.
Figure 6B:
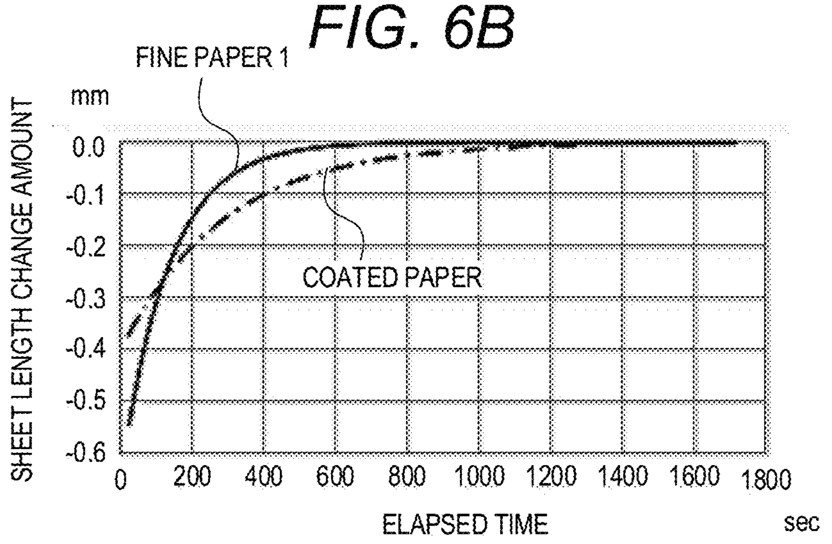
Figure 6C:
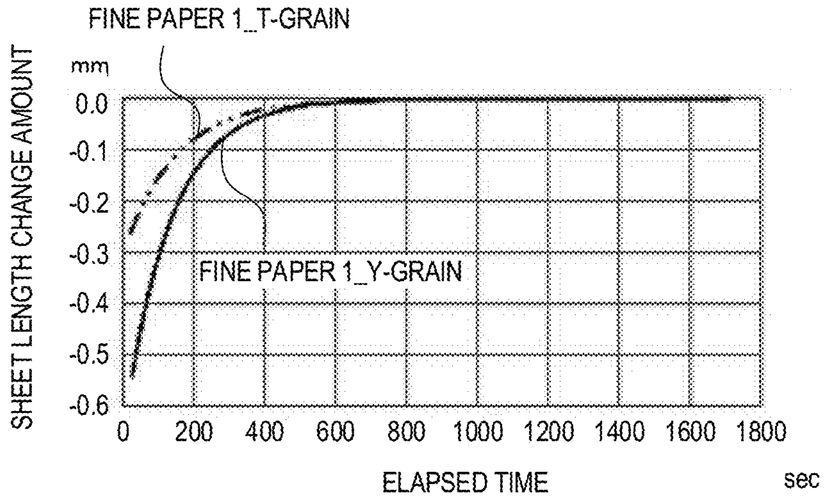

The difference in the sheet length change amount with respect to the elapsed time according to the difference in the material of the sheet (media difference) will be described below. The sheet comprises pulp fibers. However, even they say the single word "sheet", there are various kinds of sheets, such as sheets different in thickness, i.e., thin paper and thick paper, and coated paper with a coating layer. FIG. 6A, FIG. 6B, and FIG. 6C are views showing the sheet length change amount with respect to the elapsed time "t". FIG. 6A is a view showing the sheet length change amount with respect to the elapsed time "t" after passing through the fixing step for a fine paper 1 (basis weight of 81 grams per square meter (hereinafter referred to as "gsm")) which is plain paper, a fine paper 2 (basis weight of 157 gsm) which is medium-thick paper, and a fine paper 3 (basis weight of 300 gsm) which is thick paper. Comparing the fine paper 1 which is plain paper with the fine paper 2 and the fine paper 3 which are thick paper, the thick paper has a smaller sheet length change amount after passing through the fixing step than the plain paper. This is mainly because the thickness of the sheets is different. Since the thicker the sheet, the more moisture the sheet contains, the thicker the sheet, the more moisture is likely to remain in the sheet after the fixing step. Therefore, since a moisture content change rate of the thick paper is suppressed to be smaller than a moisture content change rate of the plain paper, the sheet length change amount after passing through the fixing step is smaller in the thick paper than in the plain paper. The sheet size of the thick paper is slower to return than that of the plain paper. This is because, since the sheet is thick, it takes time for moisture to be absorbed in the thickness direction of the sheet.

FIG. 6B is a view showing the sheet length change amount with respect to the elapsed time "t" after passing through the fixing step for the fine paper 1 (basis weight of 81 gsm) and the coated paper (basis weight of 84.9 gsm) which is a finely coated paper. Comparing the coated paper with the fine paper 1 which is plain paper, the coated paper has a smaller sheet length change amount after the fixing step than the plain paper. Since the basis weight of the plain paper and the coated paper is almost the same, the paper thickness of the coated paper is small as much as there is a coating layer. However, since the density of the coating layer is high and moisture is hardly removed from the coated paper, the sheet length change amount of the coated paper is smaller than that of the plain paper. Further, since the coating layer hinders moisture transfer, the sheet size of the coated paper is returned more slowly than that of the plain paper.

FIG. 6C is a view showing the sheet length change amount with respect to the elapsed time "t" after passing through the fixing step for the fine papers 1 having different grain directions. The expansion of a pulp fiber when the pulp fiber absorbs moisture is more remarkable in a radial direction (lateral direction) of the fiber than in a longitudinal direction (longitudinal direction) of the fiber, and the degree of expansion and contraction of the sheet size differs depending on the grain direction of the sheet. Therefore, the sheet length change amount in the conveyance direction is larger in the Y-grain (short grain: grain direction perpendicular to the conveyance direction) than in the T-grain (long grain: grain direction parallel to the conveyance direction). As described above, the sheet length change amount with respect to the elapsed time "t" varies depending on the media type.

[Prediction Model for Sheet Length After Fixing]

The inventors studied modeling the amount of change in the moisture content (percentage of water content) contained in the sheet after passing through the fixing step with respect to the elapsed time "t". As a result, it was found that the moisture content change model can be expressed by an exponential function equation as the following Equation (1).

$$W(t)=W\,\mathrm{inf}+(W0-W\,\mathrm{inf})\exp(-Bt) \quad \text{Equation (1)}$$

Here, the moisture content W(t) represents a moisture content (percentage of water content) contained in a sheet at an elapsed time "t". The elapsed time "t" represents an elapsed time from a time when a sheet passes through the first fixing device 150 or the second fixing device 160 in the fixing step. The elapsed time "t" is counted by a calculation unit 400 (FIG. 8) described later based on a detection signal from the sheet sensor 153 or 163. The moisture content W0 immediately after heating represents a moisture content immediately after passing through the fixing step. The sheet saturated moisture content Winf represents a moisture content of the sheet in equilibrium with a moisture content in the air (in the environment) after an infinite time (t=∞) has elapsed after the sheet passed through the fixing step. B represents a moisture absorption coefficient of a sheet. The sheet saturated moisture content Winf represents a moisture content after an infinite time elapses in a mathematical model, but represents a moisture content after an elapsed time for which the sheet is judged to sufficiently fall into the equilibrium state in practice. Since the moisture absorption coefficient B is a parameter that varies depending on the thickness of fine paper and the presence or absence of a coating layer, the moisture absorption coefficient B varies depending on a sheet type. That is, the moisture content change model of Equation (1) is peculiar to each sheet type, and it is possible to calculate Equation (1) experimentally for each sheet type. Here, Equation (1) is transformed into the following Equation (2) as a moisture content change model function (moisture content change relation information).

$$\Delta W(t)=\Delta W0\ \exp(-Bt) \quad \text{Equation (2)}$$

Figure 7A:
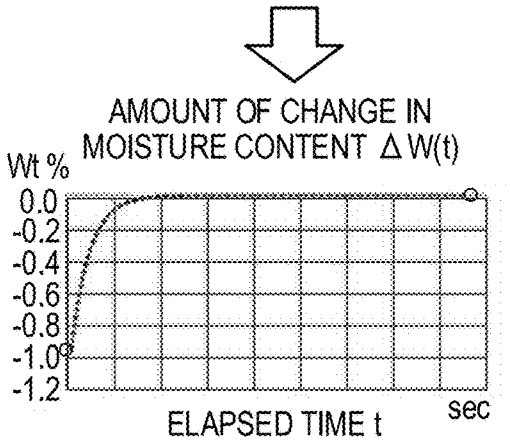
FIG. 7A, FIG. 7B, and FIG. 7C are explanatory views of a mathematical model.
Figure 7B:
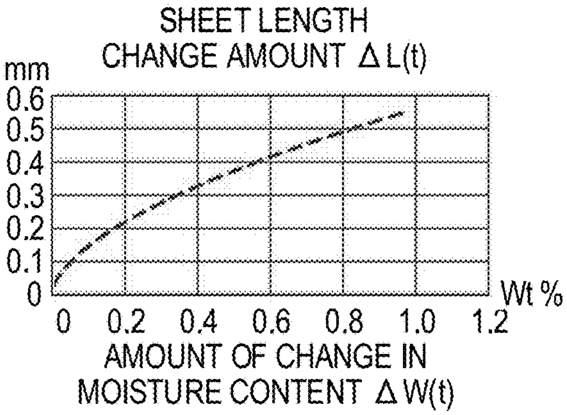
Figure 7C:
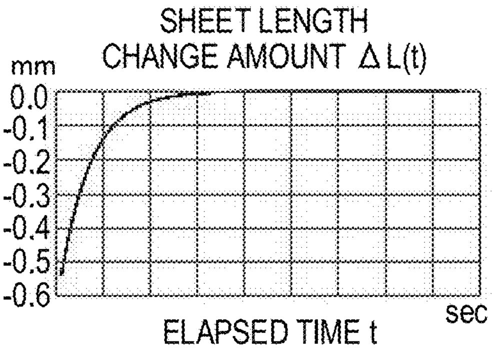

Here, an amount of change in moisture content ΔW0 immediately after heating represents a difference between the sheet saturated moisture content Winf and the moisture content W0 immediately after heating. An amount of change in moisture content ΔW(t) represents a difference between the moisture content W(t) and the sheet saturated moisture content Winf. The amount of change in moisture content ΔW(t) represents the difference between the sheet saturated moisture content Winf of the sheet fallen into equilibrium in the atmosphere and the moisture content W(t) of the sheet at the elapsed time "t". FIG. 7A, FIG. 7B, and FIG. 7C are explanatory views of mathematical models. FIG. 7A is a view showing a graph of the amount of change in moisture content ΔW(t) with respect to the elapsed time "t".

On the other hand, a relationship between the amount of change in moisture content ΔW(t) of the sheet and a sheet length change amount ΔL(t) can also be modeled from experimental values by the following Equation (3). Equation (3) is a length change model function (sheet length change relation information).

$$\Delta L(t) = q \cdot \Delta W(t)^{\frac{C}{B}} \quad \text{Equation (3)}$$

Here, the sheet length change amount ΔL(t) represents an amount of change in length of the sheet at the elapsed time "t" with respect to a length of the sheet fallen into the equilibrium state in the atmosphere. A moisture expansion rate q and a sheet length change rate C are parameters that vary depending on the sheet type. Equation (3) is also a model peculiar to each sheet type. FIG. 7B is a view showing a graph of the sheet length change amount ΔL(t) with respect to the amount of change in moisture content ΔW(t).

The sheet length change amount ΔL(t) with respect to the elapsed time "t" can be calculated from Equation (1), Equation (2), and Equation (3) by using the sheet saturated moisture content Winf (moisture content in the equilibrium state) obtained from the atmospheric temperature and humidity inside or outside the printer 100 and the moisture content W0 immediately after heating. FIG. 7C is a view showing a graph of the sheet length change amount ΔL(t) with respect to the elapsed time "t". Using Equation (1), Equation (2), and Equation (3), it is possible to predict the sheet length at the elapsed time "t" after passing through the fixing step.

[Calculation System]

Figure 8:
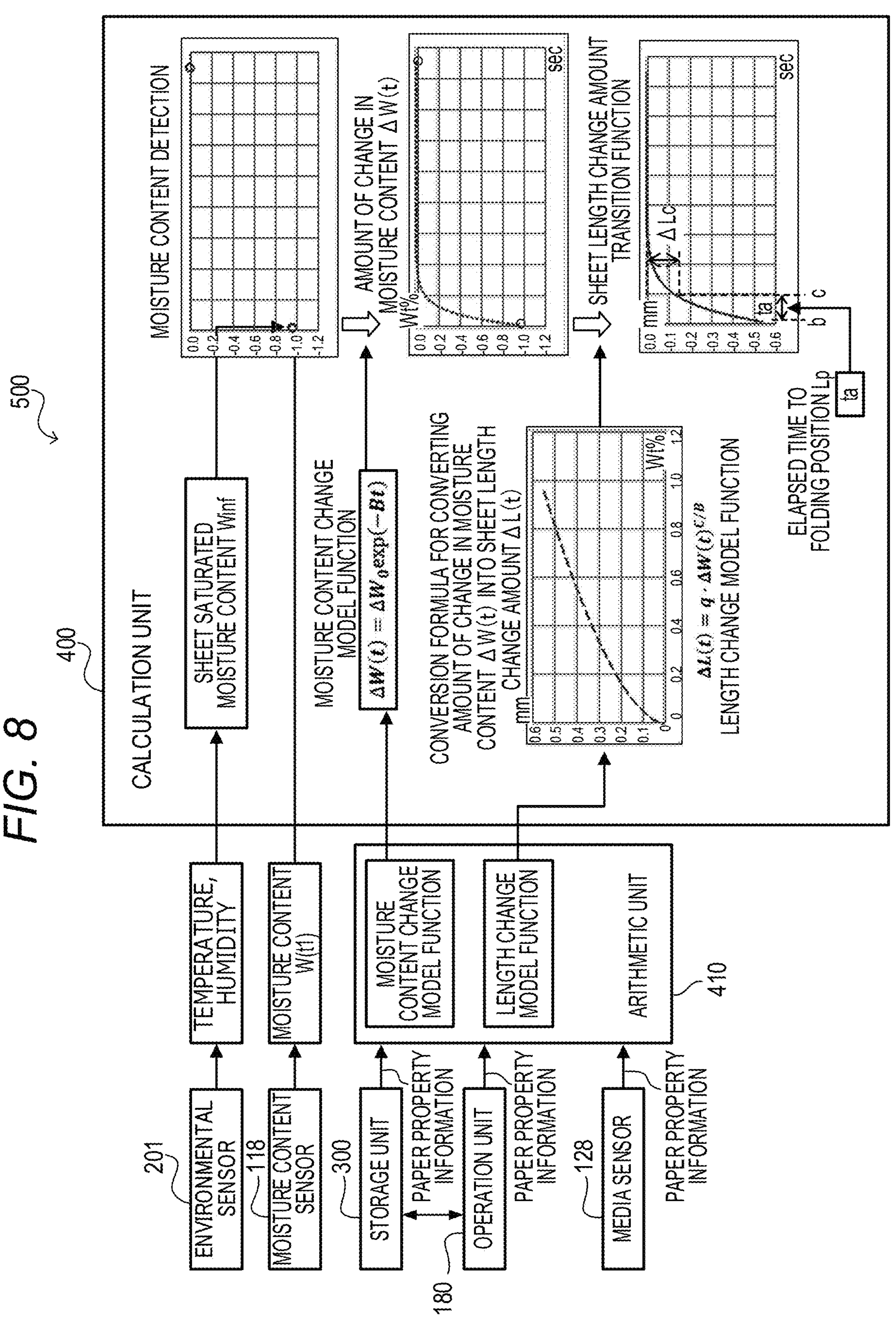
FIG. 8 is a block diagram of a calculation system.

FIG. 8 is a block diagram of a calculation system 500. The calculation system 500 is configured to calculate the sheet length change amount ΔL(t) in the conveyance direction. The calculation system 500 includes the environmental sensor (humidity detection unit) 201, a moisture content sensor (moisture content detection unit) 118, a storage unit 300, an arithmetic unit 410, and the calculation unit 400. The storage unit 300 stores physical property information (hereinafter referred to as paper property information) indicating the characteristics of the sheet. The calculation system 500 need not necessarily have the storage unit 300, but may be configured to obtain the paper property information from other devices. The calculation system 500 first specifies the paper property information of the sheet to be used. The paper property information includes information related to characteristic quantities of the sheet such as basis weight, thickness, density, grain direction, fiber orientation, and air permeability. A user may input the paper property information from an operation unit (obtaining unit) 180. The user may designate a type of the sheet to be used from the operation unit 180. The paper property information stored in the storage unit 300 provided in the main body 101 may be specified based on the designated sheet type. Further, the paper properties may be measured using a sensor such as a media sensor (obtaining unit) 128 provided inside or outside the printer 100 to determine the paper property information.

The arithmetic unit 410 has Equation (2) which is the moisture content change model function and Equation (3) which is the length change model function. The calculation unit (CPU) 400 calls up the moisture content change model function and the length change model function from the arithmetic unit 410. The arithmetic unit 410 may have a moisture content change model table indicating a relationship of the amount of change in moisture content ΔW(t) with respect to the elapsed time "t" as the moisture content change relation information. The arithmetic unit 410 may also have a sheet length change model table indicating a relationship of the sheet length change amount ΔL(t) with respect to the amount of change in moisture content ΔW(t) as the sheet length change relation information. In this case, the calculation unit 400 calls up the moisture content change model table and the sheet length change model table from the arithmetic unit 410.

The moisture content sensor 118 disposed downstream of the first fixing device 150 and the second fixing device 160 (may be collectively referred to as a fixing device) in the conveyance direction CD of the sheet detects the moisture content (percentage of water content) W(t1)=W0 contained in the sheet heated by the fixing device. Here, the elapsed time t1 is a time required from a time when the sheet passes through the fixing device to a time when the moisture content is detected by the moisture content sensor (obtaining unit) 118. The temperature and humidity detected by the environmental sensor 201 are notified to the calculation unit 400. The calculation unit 400 calculates the sheet saturated moisture content Winf based on the temperature and humidity detected by the environmental sensor 201.

Next, expansion and contraction model coefficients of the sheet are calculated from the paper property information. The expansion and contraction model coefficients include the moisture absorption coefficient B, the sheet length change rate C, and the moisture expansion rate q. Here, a method for calculating the moisture absorption coefficient B is exemplified. The moisture absorption coefficient B is calculated on the basis of the paper property information of the sheet to be used, especially the basis weight. The basis weight of the sheet to be used is measured by the media sensor 128 or called up from the storage unit 300 based on the sheet type designated by the user from the operation unit 180. By using the measured or called-up basis weight and a constant β stored in the storage unit 300, the moisture absorption coefficient B is calculated from the following Equation (4) (linear combination calculation).

$$B = \text{Constant}\,\beta \times \frac{1}{\text{Basis Weight}} \quad \text{Equation (4)}$$

That is, by obtaining the basis weight of each sheet, the moisture absorption coefficient B optimum for the sheet can be calculated. Although the method of calculating the moisture absorption coefficient B is described here, the sheet length change rate C and the moisture expansion rate q can also be calculated by linear combination calculation of the respective constants and the paper property information.

Figure 9A:
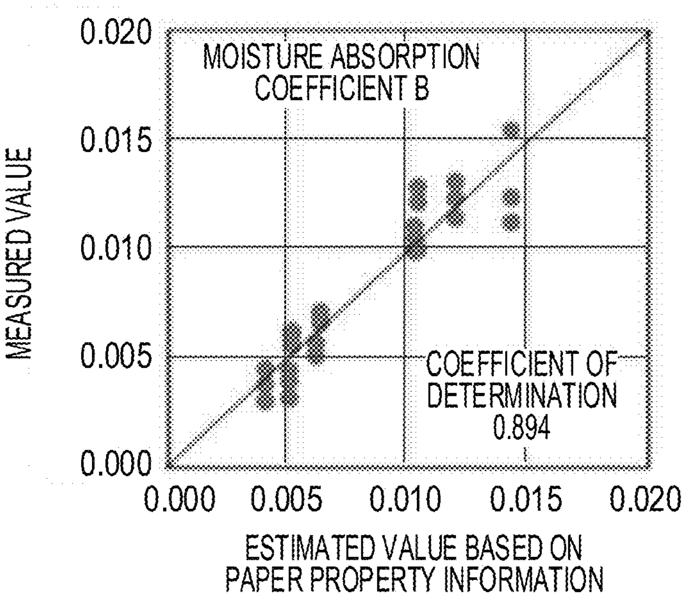
FIG. 9A, FIG. 9B, and FIG. 9C are views showing accuracy in expansion and contraction model coefficients calculated from paper property information.
Figure 9B:
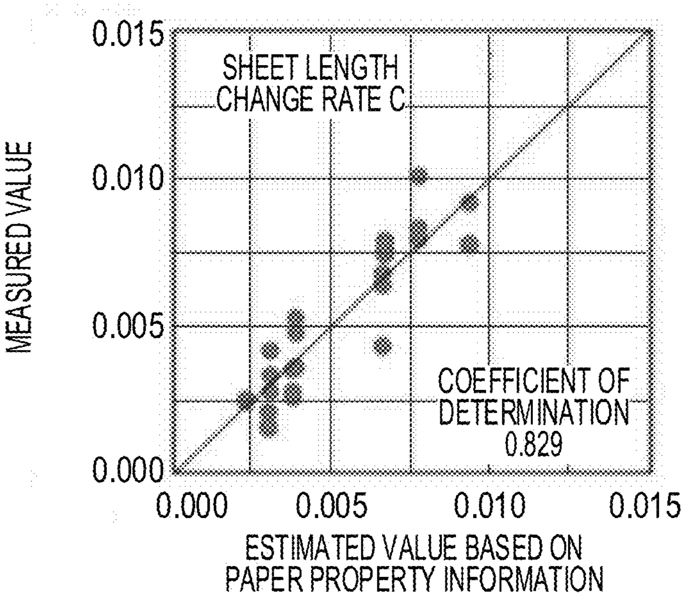
Figures 9C, 10:
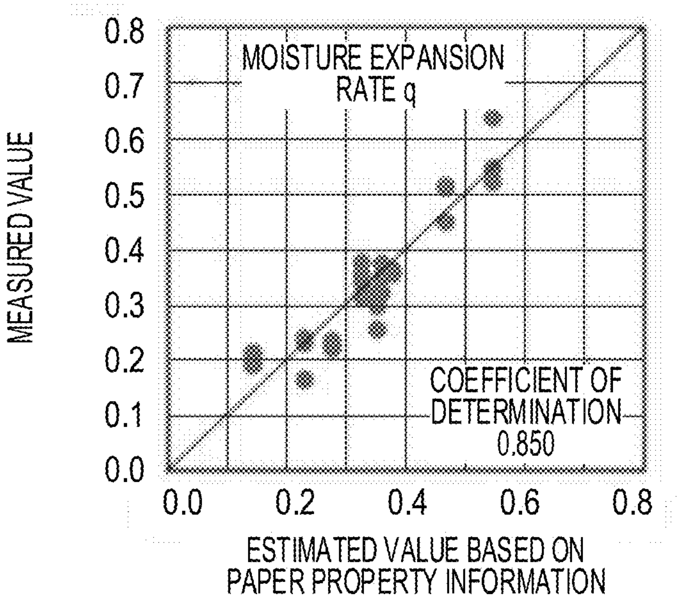
FIG. 10 is a view showing the expansion and contraction model coefficients calculated from a basis weight for each sheet type.

FIG. 9A, FIG. 9B, and FIG. 9C are views showing accuracy in the expansion and contraction model coefficients calculated from the paper property information. FIG. 9A is a view showing a relationship between a measured value and an estimated value of the moisture absorption coefficient B. The vertical axis indicates the measured value of the moisture absorption coefficient B of various sheet types obtained by the consideration. The horizontal axis indicates the estimated value of the moisture absorption coefficient B calculated by using the paper property information of the sheet types and a predetermined constant. FIG. 9B is a view showing a relationship between a measured value and an estimated value of the sheet length change rate C. The vertical axis indicates the measured value of the sheet length change rate C of various sheet types obtained by the consideration. The horizontal axis indicates the estimated value of the sheet length change rate C calculated by using the paper property information of the sheet types and a predetermined constant. FIG. 9C is a view showing a relationship between a measured value and an estimated value of the moisture expansion rate q. The vertical axis indicates the measured value of the moisture expansion rate q of various sheet types obtained by the consideration. The horizontal axis indicates the estimated value of the moisture expansion rate q calculated by using the paper property information of the sheet types and a predetermined constant.

As shown in FIG. 9A, FIG. 9B, and FIG. 9C, the measured value and the estimated value are close to each other, that is, the measured value and the estimated value show a high correlation. A coefficient of determination indicating the strength of the correlation also shows a high value, which means that it is possible to calculate the moisture absorption coefficient B, the sheet length change rate C, and the moisture expansion rate q from the paper property information. In FIG. 9A, FIG. 9B, and FIG. 9C, the estimated value is calculated by using the basis weight as the paper property information. However, there is a media difference in the expansion and contraction of the sheet. Therefore, the moisture absorption coefficient B, the sheet length change rate C, and the moisture expansion rate q can be calculated more accurately by using the paper property information such as the grain direction information or the fiber orientation of the sheet.

FIG. 10 is a view showing the expansion and contraction model coefficients calculated from the basis weight for each sheet type. The expansion and contraction model coefficients include the moisture absorption coefficient B, the sheet length change rate C, and the moisture expansion rate q. The sheet types includes the fine paper 1 having the basis weight of 81 gsm, the fine paper 2 having the basis weight of 157 gsm, the fine paper 3 having the basis weight of 300 gsm, and the coated paper having the basis weight of 84.9 gsm. The moisture absorption coefficient B, the sheet length change rate C, and the moisture expansion rate q are calculated to be different for each sheet type, and the sheet length change amount ΔL(t) is predicted based on the calculation result.

The arithmetic unit 410 calculates the moisture absorption coefficient B, the sheet length change rate C, and the moisture expansion rate q. The arithmetic unit 410 inputs the calculated moisture absorption coefficient B, the calculated sheet length change rate C, and the calculated moisture expansion rate q to the calculation unit 400. The calculation unit 400 calculates a function for predicting the sheet length change amount ΔL(t) with respect to the elapsed time "t" after the fixing step by using the moisture content change model function, the length change model function, the moisture content W(t1), the sheet saturated moisture content Winf, the moisture absorption coefficient B, the sheet length change rate C, and the moisture expansion rate q. First, the calculation unit 400 calculates the moisture content change model function (Equation (2)) of the sheet to be used by using the moisture content W(t1) and the sheet saturated moisture content Winf From the calculated moisture content change model function and the length change model function (Equation (3)), the calculation unit 400 calculates the sheet length change amount transition function (sheet length change amount transition relation information) representing a relationship of the sheet length change amount ΔL(t) with respect to an arbitrary elapsed time "t". The sheet length change amount ΔL(t) at the arbitrary elapsed time "t" after the fixing step can be predicted by using the calculated sheet length change amount transition function.

(Control Operation)

Figure 11:
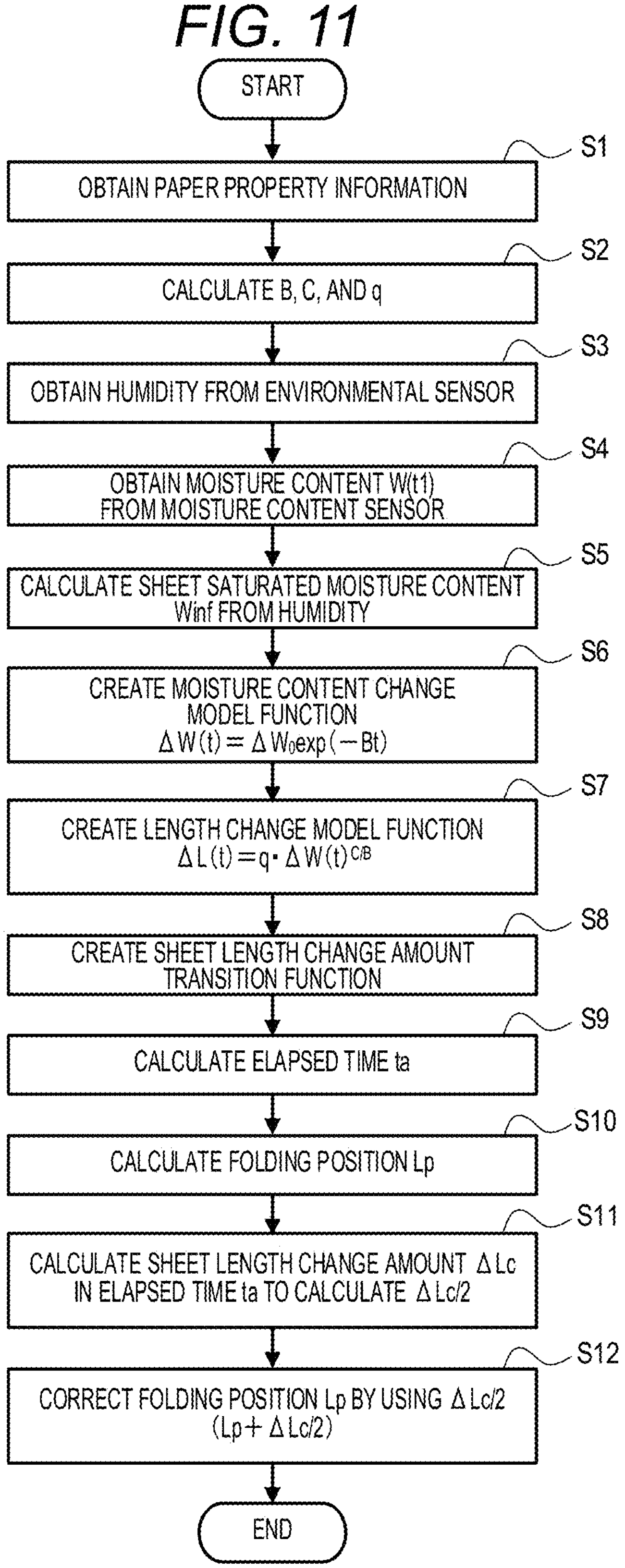
FIG. 11 is a flowchart showing a control operation of the calculation system.

FIG. 11 is a flowchart showing a control operation of the calculation system 500. A program of the control operation is stored in a ROM (not shown). The calculation unit 400 and the arithmetic unit 410 read the program from the ROM (not shown). When the control operation is started, the arithmetic unit (obtaining unit) 410 of the calculation system 500 obtains the paper property information (S1). The paper property information may be input from the operation unit 180 to the arithmetic unit 410 by the user, or the paper property information measured by the media sensor 128 may be input to the arithmetic unit 410. The arithmetic unit 410 calculates the moisture absorption coefficient B, the sheet length change rate C, and the moisture expansion rate q (S2). The calculation unit 400 obtains the humidity detected by the environmental sensor 201 (S3). The calculation unit 400 obtains the moisture content W(t1) detected by the moisture content sensor 118 at the elapsed time t1 required from when after the sheet passes through the fixing device to when the moisture content is detected by the moisture content sensor 118 (S4). The calculation unit 400 calculates the sheet saturated moisture content Winf from the humidity detected by the environmental sensor 201 (S5).

The calculation unit 400 creates the moisture content change model function (Equation (2)) representing the relationship of the amount of change in moisture content ΔW(t) with respect to the elapsed time "t" (S6). The calculation unit 400 creates the length change model function (Equation (3)) representing the relationship of the sheet length change amount $\Delta L(t)$ with respect to the amount of change in moisture content $\Delta W(t)$ (S7). The calculation unit 400 creates the sheet length change amount transition function representing the relationship of the sheet length change amount $\Delta L(t)$ with respect to the elapsed time "t" by using the moisture content change model function and the length change model function (S8).

The calculation unit 400 calculates the elapsed time "ta" from the time when the sheet passes through the fixing device to a time when the sheet reaches the folding position Lp in which the folding process of the sheet is performed by the folding unit 50 (S9). The calculation unit 400 calculates the folding position Lp based on the sheet folding specifications, for example, set by the user from the operation unit 180 (S10). The calculation unit 400 calculates the sheet length change amount $\Delta Lc$ in the elapsed time "ta" in which the sheet reaches the folding position Lp, and calculates $\Delta Lc/2$ (S11). The calculation unit 400 corrects the folding position Lp by using $\Delta Lc/2$ (folding position $Lp+\Delta Lc/2$) (S12). The calculation unit 400 ends the control operation.

In the present embodiment, the paper property information is information related to the basis weight, thickness, density, grain direction, fiber orientation, air permeability, and other characteristics of the sheet. As long as the paper property information can be used to predict a change in moisture content of the sheet or a change in amount of expansion and contraction of the sheet, the paper property information may be another type of paper property regardless of the above-described examples.

In the present embodiment, the folding unit 50 is described as a post-processing apparatus. However, the present disclosure is not limited to the post-processing apparatus, and can be applied to the double-sided image formation of the printer 100. The printer 100 can perform the double-sided image formation for forming images on both sides of the sheet. Since a sheet length at the time of forming an image on the first side of the sheet and a sheet length at the time of forming an image on the second side are different, a positional displacement between the image on the first side and the image on the second side, so-called a front/back misregistration, occurs. The present disclosure can be applied to prevent this front/back misregistration. In this case, an elapsed time "tb" is defined as an elapsed time from a time when a sheet on which a toner image is formed on the first side passes through the fixing device to a time when an image is formed on the second side opposite to the first side by the image forming portion 200. The calculation system 500 calculates a sheet length change amount $\Delta L(tb)$ by using the elapsed time "tb". The image forming portion 200 corrects an image forming position in which the image is formed on the second side of the sheet based on the sheet length change amount $\Delta L(tb)$. Thereby, the positional displacement of the images formed on both sides of the sheet can be suppressed.

In the present embodiment, the method for calculating the moisture absorption coefficient B, the sheet length change rate C, and the moisture expansion rate q as the expansion and contraction model coefficients of the sheet from the paper property information is described by using the linear combination calculations. However, the present disclosure is not limited to the linear combination calculations, and the expansion and contraction model coefficients of a sheet may be calculated by using a higher dimensional calculation method or a machine learning. According to the present embodiment, the amount of change in length of the sheet in the conveyance direction of the sheet can be calculated by using the information of the sheet and the elapsed time after heating of the sheet.

Second Embodiment

The second embodiment will be described below. In the second embodiment, the same structures as in the first embodiment are denoted by the same reference numerals, and a description thereof is omitted. The image forming system 10 of the second embodiment is the same as that of the first embodiment, and therefore a description thereof is omitted. In the second embodiment, the amount of change in length of the sheet in the conveyance direction of the sheet is calculated by using the type of the sheet and the elapsed time after heating of the sheet. Hereinafter, differences from the first embodiment will be mainly described.

As in the first embodiment, the sheet length change amount $\Delta L(t)$ with respect to the elapsed time "t" can be calculated from Equation (1), Equation (2), and Equation (3) by using the sheet saturated moisture content Winf obtained from the atmospheric temperature and humidity inside or outside the printer 100 and the moisture content W0 immediately after heating. Using Equation (1), Equation (2), and Equation (3), it is possible to predict the sheet length at the elapsed time "t" after passing through the fixing step. In the second embodiment, the moisture absorption coefficient B, the sheet length change rate C, and the moisture expansion rate q (FIG. 10) as the expansion and contraction model coefficients of a sheet to be used in Equation (1), Equation (2), and Equation (3) are obtained in advance for each type of sheet and stored in the storage unit 300.

[Calculation System]

Figure 12:
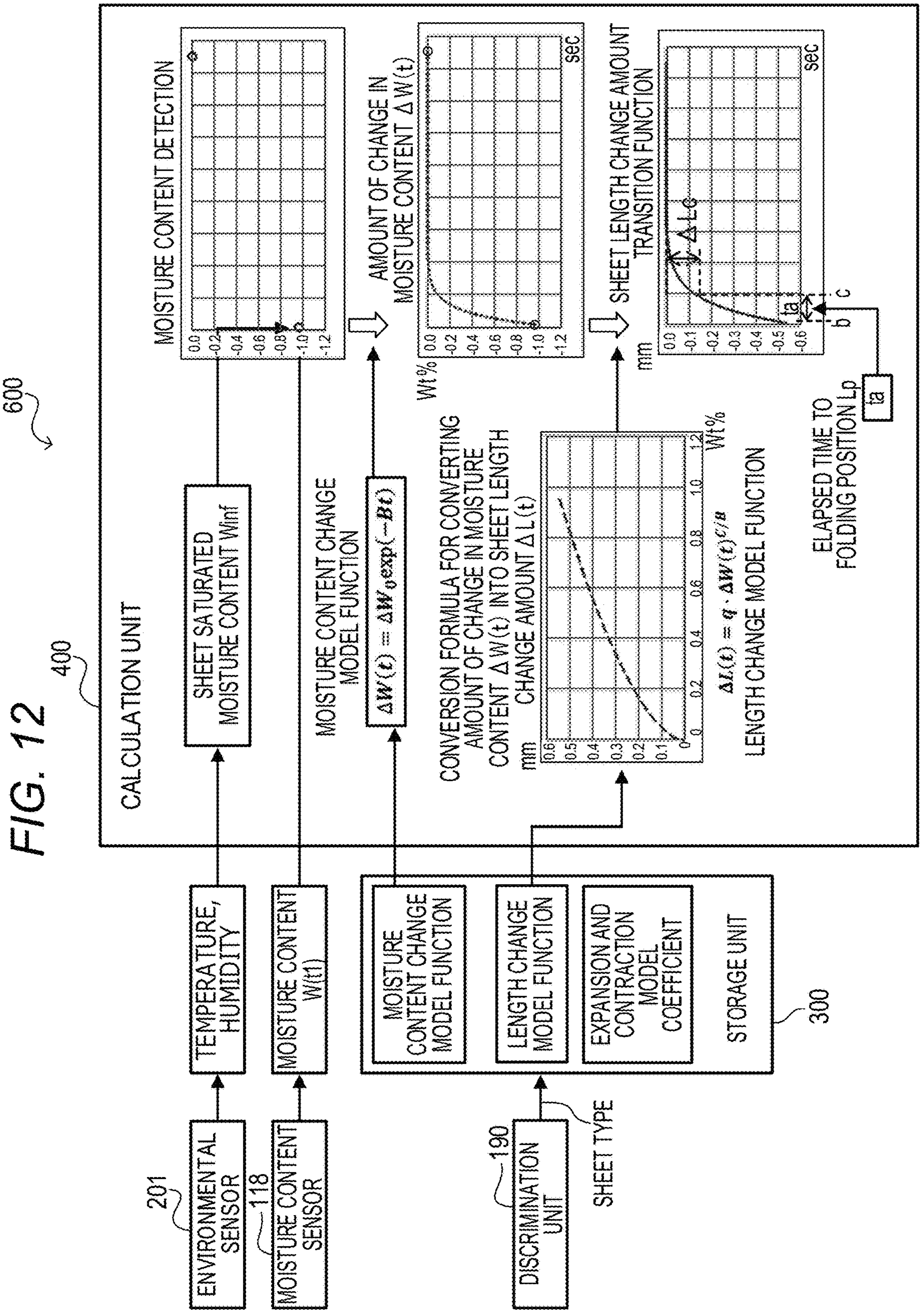
FIG. 12 is a block diagram of a calculation system of a second embodiment.

FIG. 12 is a block diagram of a calculation system 600 of the second embodiment. The calculation system 600 is configured to calculate the sheet length change amount $\Delta L(t)$ in the conveyance direction. The calculation system 600 includes the environmental sensor (humidity detection unit) 201, the moisture content sensor (moisture content detection unit) 118, a discrimination unit 190, the storage unit 300, and the calculation unit 400.

When a job is inputted to the printer 100, the discrimination unit (obtaining unit) 190 discriminates a sheet type of a sheet to be used for the job. The determination unit 190 may be, for example, the operation unit 180 (FIG. 1). The sheet type selected from the operation unit 180 by a user may be determined as the sheet type of the sheet to be used. The discrimination unit 190 may be, for example, a media sensor (not shown). The sheet type detected by the media sensor (not shown) may be determined as the sheet type of the sheet to be used. In the present embodiment, in order to determine the sheet type, it is sufficient to obtain, for example, the basis weight of the sheet and the surface characteristics indicating whether the sheet is plain paper or coated paper.

The storage unit 300 has Equation (2) as the moisture content change model function, Equation (3) as the length change model function, and the expansion and contraction model coefficients corresponding to the sheet types. In a case in which the sheet type is discriminated by the discrimination unit 190, the calculation unit (CPU) 400 calls up the moisture content change model function and the length change model function corresponding to the sheet type from the storage unit 300. Note that the storage unit 300 may have the moisture content change model table indicating the relationship of the amount of change in moisture content $\Delta W(t)$ with respect to the elapsed time "t" as the moisture content change relation information. Further, the storage unit 300 may have the sheet length change model table indicating the relationship of the sheet length change amount ΔL(t) with respect to the amount of change in moisture content ΔW(t) as the sheet length change relation information. In this case, the calculation unit 400 calls up the moisture content change model table and the sheet length change model table from the storage unit 300.

The moisture content sensor 118 disposed downstream of the first fixing device 150 and the second fixing device 160 (may be collectively referred to as the fixing device) in the conveyance direction CD of the sheet detects the moisture content (percentage of water content) W(t1)=W0 contained in the sheet heated by the fixing device. Here, the elapsed time t1 is the time required from the time when the sheet passes through the fixing device to the time when the moisture content is detected by the moisture content sensor 118. The temperature and humidity detected by the environmental sensor 201 are notified to the calculation unit 400. The calculation unit 400 calculates the sheet saturated moisture content Winf based on the temperature and humidity detected by the environmental sensor 201.

The calculation unit 400 calculates a function for predicting the sheet length change amount ΔL(t) with respect to the elapsed time "t" after the fixing step by using the moisture content change model function, the length change model function, the moisture content W(t1), and the sheet saturated moisture content Winf First, the calculation unit 400 calculates the moisture content change model function (Equation (2)) of the sheet to be used by using the moisture content W(t1) and the sheet saturated moisture content Winf. From the calculated moisture content change model function and the length change model function (Equation (3)), the calculation unit 400 calculates the sheet length change amount transition function (sheet length change amount transition relation information) representing the relationship of the sheet length change amount ΔL(t) with respect to the arbitrary elapsed time "t". The sheet length change amount ΔL(t) at the arbitrary elapsed time "t" after the fixing step can be predicted by using the calculated sheet length change amount transition function.

(Control Operation)

Figure 13:
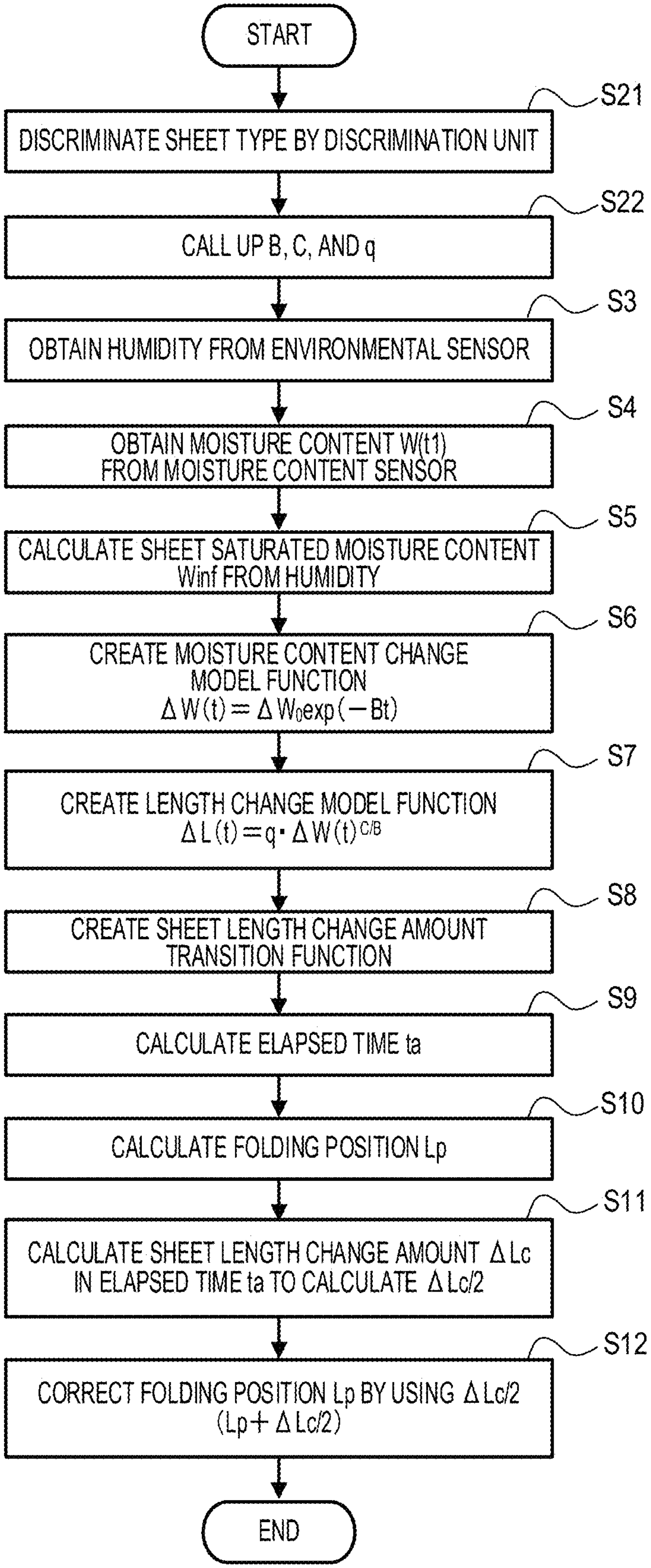
FIG. 13 is a flowchart showing a control operation of the calculation system of the second embodiment.

FIG. 13 is a flowchart showing a control operation of the calculation system 600 of the second embodiment. A program of the control operation is stored in a ROM (not shown). The calculation unit 400 reads the program from the ROM (not shown). When the control operation is started, the calculation system 600 discriminates the sheet type by the discrimination unit 190 (S21). The sheet type may be selected from the operation unit 180 by the user or may be measured by a media sensor (not shown). The calculation unit 400 calls up the moisture absorption coefficient B, the sheet length change rate C, and the moisture expansion rate q from the storage unit 300 according to the sheet type discriminated by the discrimination unit 190 (S22). Since the subsequent steps S3 to S12 are the same as the steps S3 to S12 in FIG. 11 of the first embodiment, the description thereof is omitted. According to the second embodiment, the amount of change in length of the sheet in the conveyance direction of the sheet can be calculated by using the type of the sheet and the elapsed time after heating of the sheet.

[Cooperation Between Printer and Folding Unit]

Figure 14:
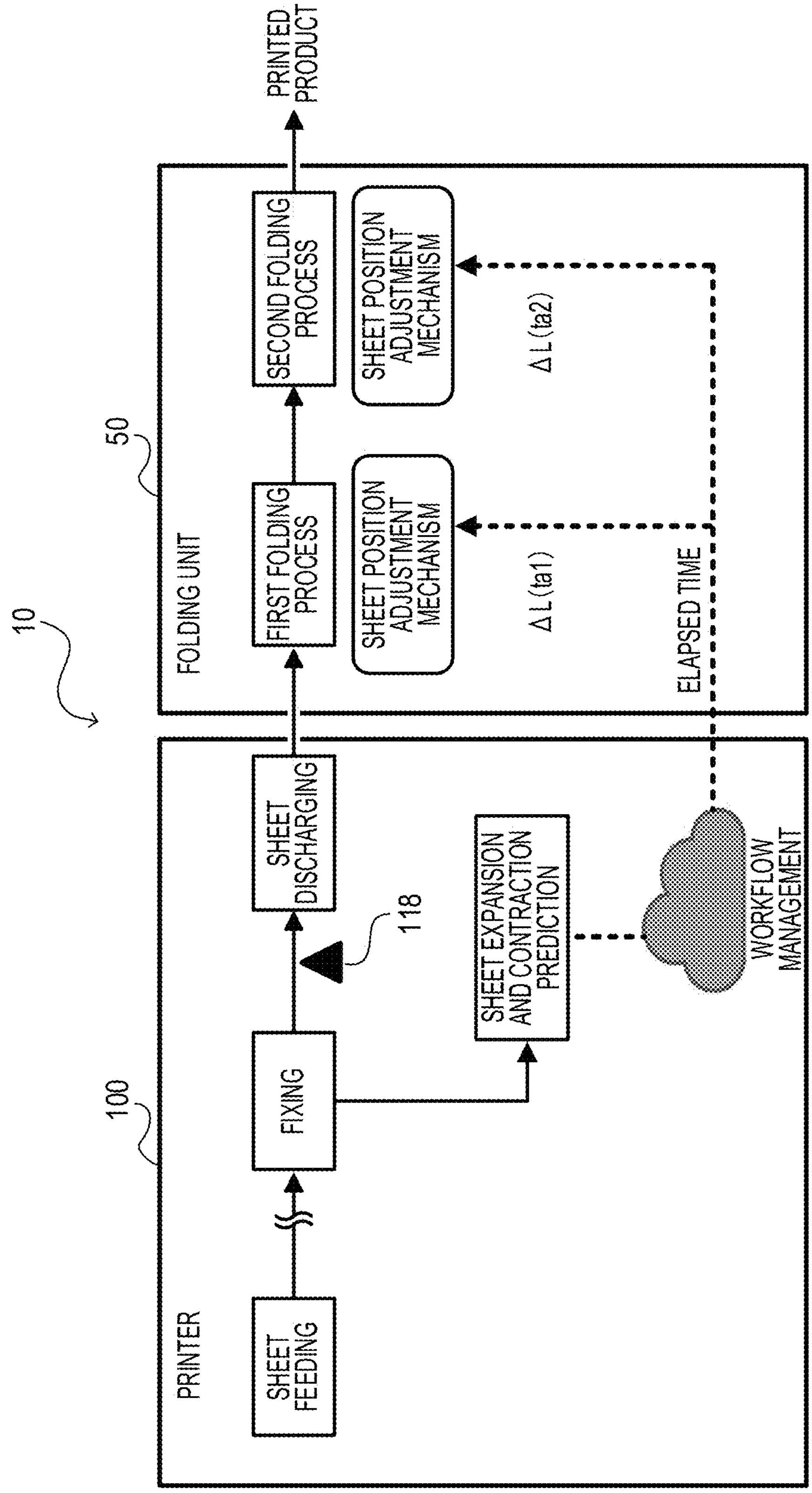
FIG. 14 is a block diagram of an image forming system.

A cooperation between the printer 100 and the folding unit 50 will be described with reference to FIG. 14. FIG. 14 is a block diagram of the image forming system 10. An elapsed time ta1 from a time when a sheet passes through the fixing device to a time when the sheet reaches the position in which the first folding process is performed is substituted into the sheet length change amount transition function (FIG. 8 and FIG. 12) to obtain a sheet length change amount ΔL(ta1) when the first folding process is performed on the sheet. An elapsed time ta2 from the time when the sheet passes through the fixing device to a time when the sheet reaches the position in which the second folding process is performed is substituted into the sheet length change amount transition function (FIG. 8 and FIG. 12) to obtain a sheet length change amount ΔL(ta2) when the second folding process is performed on the sheet. The elapsed times ta1 and ta2 vary depending on the configuration of the printer 100 as the image forming apparatus and the configuration of the folding unit 50 as the post-processing apparatus. As for the elapsed times ta1 and ta2, the user may be required to input numerical values, or the user may be required to input the configuration of the image forming system 10, and the elapsed times ta1 and ta2 corresponding to the configuration may be stored in the storage unit of the image forming system 10. Alternatively, the calculation unit 400 as a control unit automatically discriminates the post-processing apparatus such as the folding unit 50 connected to the printer 100 as the image forming apparatus to determine the elapsed times ta1 and ta2.

In the embodiment, the calculation unit 400 calculates the predicted length of the sheet. The calculation unit 400 may be provided in the main body 101 of the printer 100 and configured to notify the folding unit 50 of a correction value for correcting the folding position. The calculation unit 400 may be provided outside the printer 100, in a cloud, or in a print server. The calculation unit 400 may be configured to notify the folding unit 50 of the predicted length of the sheet at the time of folding process, and a control unit provided in the folding unit 50 may generate a correction value for correcting the folding position based on the predicted length. According to the present embodiment, an expansion and contraction amount of the sheet can be predicted, and the processing position of the post-processing apparatus can be corrected based on the predicted expansion and contraction amount. The calculation unit 400 may be provided in any one of the printer 100, the folding unit 50, and other external equipment. The calculation result of the calculation unit 400 is not limited to the sheet length change amount, but may be the sheet length, the processing position, or other values.

According to the present embodiment, the sheet length change amount with respect to the elapsed time after the sheet passes through the fixing device can be calculated from the sheet information (paper property information, sheet type). This makes it possible to improve the accuracy of the processing position of the post-processing apparatus connected in an in-line or near-line manner to the image forming apparatus with respect to a wide variety of sheets, and it is also possible to suppress the front/back positional displacement of images at the time of double-sided printing.

According to the present embodiment, the sheet length change amount with respect to the elapsed time after heating of the sheet can be calculated from the sheet information (paper property information, sheet type). Therefore, for a wide variety of sheets, the accuracy of the processing position of the post-processing apparatus can be improved, and the positional displacement (front/back misregistration) between images of both sides at the time of double-sided printing can be suppressed. In addition, according to the present embodiment, since it is not necessary to leave the sheet after image formation for a long time before post-processing, productivity is improved as compared with the case where the sheet is left to bring the sheet length after image formation into an equilibrium state. According to the present embodiment, the amount of change in length of the sheet in the conveyance direction of the sheet can be calculated by using the information of the sheet (paper property information, sheet type) and the elapsed time after heating of the sheet.

The calculation method of the sheet length change amount according to the first and second embodiments is explained. However, the calculation method of the sheet length change amount may be the following first and second modification examples.

First Modification Example

Figure 15A:
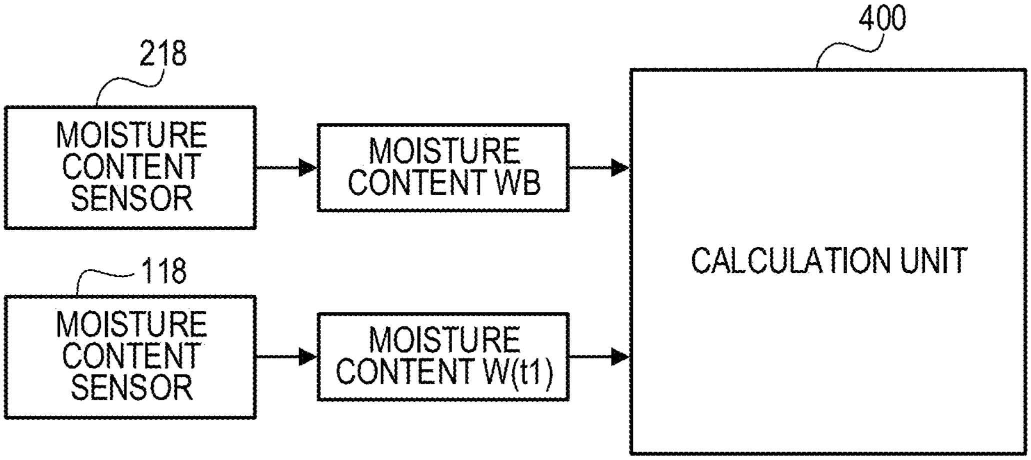
FIG. 15A and FIG. 15B are views showing first modification examples.
Figure 15B:
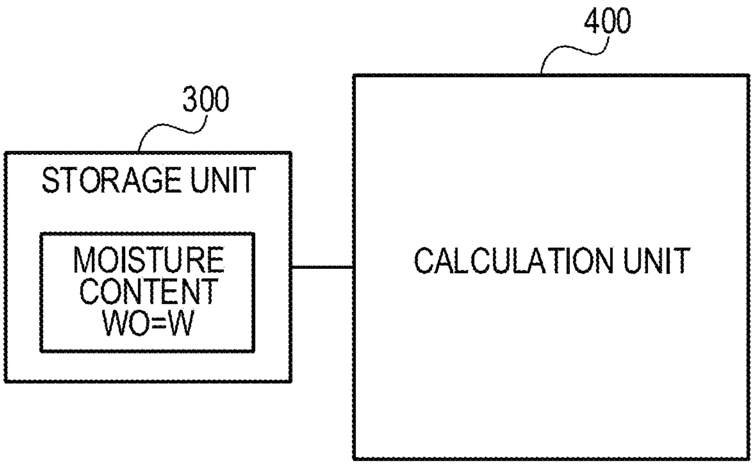

In the first and second embodiments, the configuration in which the calculation unit 400 calculates the sheet saturated moisture content Winf based on the temperature and humidity detected by the environmental sensor 201 is exemplified. However, in order to obtain the sheet saturated moisture content Winf, the calculation system may be configured as in the first modification examples. FIG. 15A and FIG. 15B are views showing first modification examples. As shown in FIG. 15A, a moisture content sensor 218 configured to detect a moisture content WB of the sheet in a state before passing through the fixing device is provided separately from the moisture content sensor 118 configured to detect the moisture content W(t1) of the sheet after passing through the fixing device. The moisture content sensor (first moisture content detection unit) 118 may be disposed downstream of the fixing device in the conveyance direction. The moisture content sensor (second moisture content detection unit) 218 may be disposed upstream of the fixing device in the conveyance direction. Then, the calculation unit 400 may obtain the sheet saturated moisture content Winf based on the moisture content WB of the sheet before passing through the fixing device, which is detected by the moisture content sensor 218 provided separately.

In the first and second embodiments, the configuration in which the moisture content sensor 118 detects the moisture content W0=W(t1) immediately after heating is exemplified. However, as shown in FIG. 15B, the moisture content W0=W immediately after heating for each type of sheet is obtained in advance in an experiment and stored in the storage unit 300. The calculation unit 400 may be configured to use the moisture content W0 immediately after heating stored in the storage unit 300 when the calculation unit 400 calculates the sheet length change amount by using a function. In this case, although the calculated sheet length change amount is slightly inaccurate, the moisture content sensor 118 is not required, so that a low-cost calculation system can be constructed. According to the first modification examples, the amount of change in length of the sheet in the conveyance direction of the sheet can be calculated by using the information of the sheet and the elapsed time after heating of the sheet.

Second Modification Examples

Figure 16A:
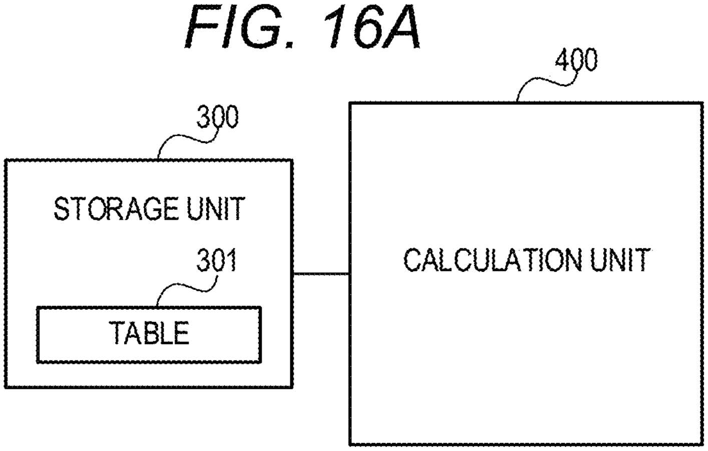
FIG. 16A, FIG. 16B, and FIG. 16C are views showing second modification examples.
Figure 16B:
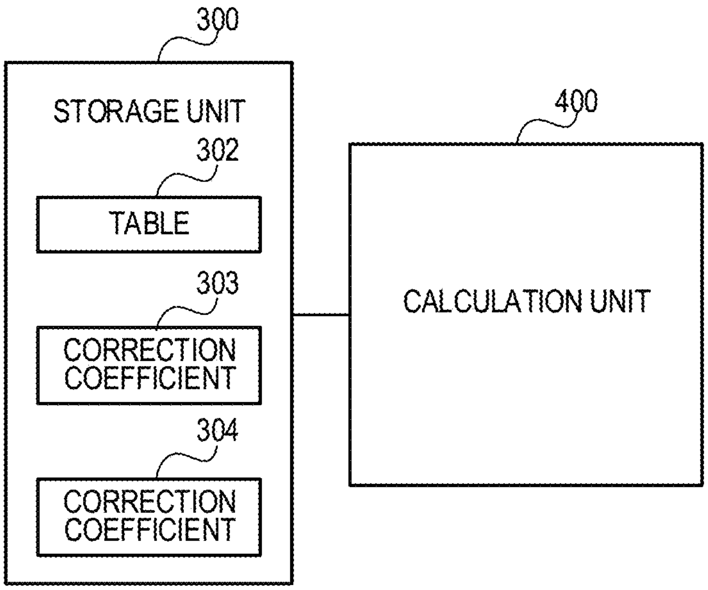
Figure 16C:
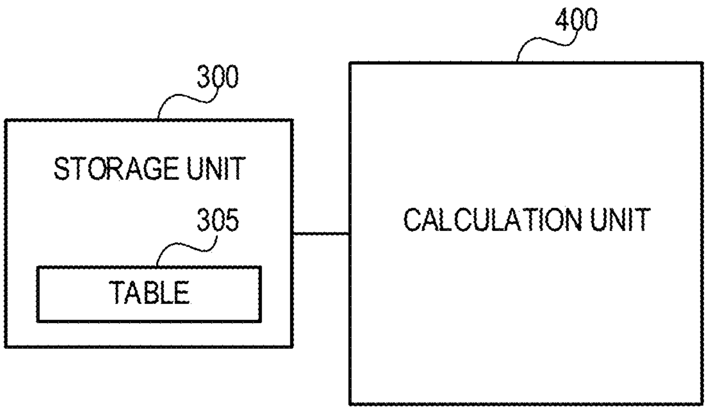

FIG. 16A, FIG. 16B, and FIG. 16C are views showing second modification examples. For each type of sheet, the relationship between the elapsed time and the sheet length change amount is obtained in advance by experiment. As shown in FIG. 16A, a table 301 indicating the relationship between the elapsed time and the sheet length change amount for each type of sheet obtained by the experiment is stored in the storage unit 300. The calculation unit 400 may refer to the table 301 for each type of sheet as an image formation object so that the calculation unit 400 calculates the sheet length change amount from the elapsed time. In this case, the sheet length change amount may be calculated by multiplying a value obtained by referring to the table 301 by, for example, a correction coefficient based on the environment.

Alternatively, it may be constructed as follows. A relationship between the elapsed time and a value corresponding to the sheet length change amount is obtained in advance by experiment. As shown in FIG. 16B, a table 302 showing the relationship between the elapsed time and the value corresponding to the sheet length change amount is stored in the storage unit 300. The storage unit 300 has a correction coefficient 303 for each type of sheet and a correction coefficient 304 corresponding to the environment. The calculation unit 400 obtains the value corresponding to the sheet length change amount based on the elapsed time by referring to the table 302. The calculation unit 400 may calculate the sheet length change amount by multiplying the value obtained by referring to the table 302 by the correction coefficient 303 corresponding to the type of sheet and the correction coefficient 304 corresponding to the environment.

As shown in FIG. 16C, values calculated by using a function are stored in the storage unit 300 as a table 305 for each type of sheet. The calculation unit (control unit) 400 may calculate the sheet length change amount with reference to the table 305. The table 305 for each type of sheet is a table indicating a relationship between the elapsed time after passing through the fixing device and the calculated sheet length change amount.

There are a wide variety of sheet manufacturing methods, and a wide variety of types and characteristics of sheets distributed in the market for use by users. In other words, the rate of absorbing moisture in the surrounding air varies from sheet to sheet. Although it is difficult to apply the second modification examples to various types of sheets, the second modification examples can be easily constructed. According to the second modification examples, the amount of change in length of the sheet in the conveyance direction of the sheet can be calculated by using the information of the sheet and the elapsed time after heating of the sheet.

OTHER EMBODIMENTS

Embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc™ (BD)), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-149851, filed Sep. 15, 2021, Japanese Patent Application No. 2021-149855, filed Sep. 15, 2021, and Japanese Patent Application No. 2022-102722, filed Jun. 27, 2022, which are hereby incorporated by reference herein in their entirety.

What is claimed is:

1. An image forming system comprising:

an image former configured to form a toner image on a sheet;

a heater configured to heat the sheet to fix the toner image to the sheet;

a post-processing apparatus configured to perform a post-processing on the sheet on which the image is fixed by the heater; and a calculator configured to calculate an amount of change in length of the sheet based on an elapsed time from a time when the sheet passes through the heater, wherein the post-processing apparatus is configured to perform the post-processing on the sheet based on the amount of the change in the length of the sheet calculated by the calculator.

2. The image forming system according to claim 1, further comprising an obtainer configured to obtain information of the sheet, wherein the calculator is configured to calculate the amount of the change in the length of the sheet in a conveyance direction of the sheet based on the information of the sheet obtained by the obtainer and the elapsed time from the time when the sheet passes through the heater.

3. The image forming system according to claim 2, further comprising a moisture content detector configured to detect a moisture content contained in the sheet heated by the heater, wherein, in a case where the sheet is heated by the heater, the calculator calculates the amount of the change in the length of the sheet heated by the heater based on (i) the information of the sheet obtained by the obtainer, (ii) the elapsed time from the time when the sheet passes through the heater, and (iii) the moisture content detected by the moisture content detector.

4. The image forming system according to claim 3, wherein the moisture content detector is disposed downstream of the heater in the conveyance direction.

5. The image forming system according to claim 3, wherein the moisture content detector includes a first moisture content detector disposed downstream of the heater in the conveyance direction, and includes a second moisture content detector disposed upstream of the heater in the conveyance direction.

6. The image forming system according to claim 2, further comprising a humidity detector configured to detect a humidity of air to which the sheet is exposed, wherein, in a case where the sheet is heated by the heater, the calculator calculates the amount of the change in the length of the sheet heated by the heater based on (i) the information of the sheet obtained by the obtainer, (ii) the elapsed time from the time when the sheet passes through the heater, and (iii) the humidity detected by the humidity detector.

7. The image forming system according to claim 2, further comprising:

a moisture content detector configured to detect a moisture content contained in the sheet heated by the heater; and a humidity detector configured to detect a humidity of air to which the sheet is exposed, wherein, in a case where the sheet is heated by the heater, the calculator calculates the amount of the change in the length of the sheet heated by the heater based on (i) the information of the sheet obtained by the obtainer, (ii) the elapsed time from the time when the sheet passes through the heater, (iii) the moisture content detected by the moisture content detector, and (iv) the humidity detected by the humidity detector.

8. The image forming system according to claim 2, wherein the calculator is configured to calculate a sheet length change amount transition relation information representing a relationship of the amount of the change in the length of the sheet with respect to the elapsed time.

9. The image forming system according to claim 2, further comprising an arithmetic operator configured to calculate, by using the obtained information of the sheet, (i) a moisture content change relation information representing a relationship of an amount of change in moisture content with respect to the elapsed time and (ii) a sheet length change relation information representing a relationship of the amount of the change in the length of the sheet with respect to the amount of the change in the moisture content.

10. The image forming system according to claim 9, further comprising:

a moisture content detector configured to detect a moisture content contained in the sheet heated by the heater; and a humidity detector configured to detect a humidity of air to which the sheet is exposed, wherein the calculator is configured to calculate the amount of the change in the length of the sheet from the moisture content change relation information and the sheet length change relation information by using the obtained information of the sheet, the detected moisture content, the detected humidity, and the elapsed time.

11. The image forming system according to claim 2, further comprising an operator configured to input the information of the sheet.

12. The image forming system according to claim 2, further comprising a storage configured to store the information of the sheet.

13. The image forming system according to claim 2, further comprising a media sensor configured to detect the information of the sheet.

14. The image forming system according to claim 2, wherein the obtainer includes a discriminator configured to discriminate a type of the sheet in order to obtain the information of the sheet.

15. The image forming system according to claim 14, further comprising a storage configured to store, for each type of the sheet, a moisture content change relation information representing a relationship of an amount of change in moisture content with respect to the elapsed time and a sheet length change relation information representing a relationship of the amount of the change in the length of the sheet with respect to the amount of the change in moisture content.

16. The image forming system according to claim 15, wherein the calculator is configured to call up the moisture content change relation information and the sheet length change relation information from the storage based on the type of the sheet discriminated by the discriminator.

17. The image forming system according to claim 16, wherein the calculator is configured to calculate the amount of the change in the length of the sheet from the moisture content change relation information and the sheet length change relation information by using the elapsed time.

18. The image forming system according to claim 14, wherein the discriminator includes an operator configured to allow a user to select the type of the sheet.

19. The image forming system according to claim 1, further comprising an obtainer configured to obtain information of the sheet, wherein the calculator is configured to calculate the amount of the change in the length of the sheet based on the information of the sheet obtained by the obtainer and the elapsed time from the time when the sheet passes through the heater to a time when the post-processing is performed by the post-processing apparatus.

20. The image forming system according to claim 19, wherein, in a case of forming images on both sides of the sheet, the calculator calculates the amount of the change in the length of the sheet by using an elapsed time from a time when the sheet on which a toner image is fixed on a first side passes through the heater to a time when an image is formed on a second side opposite to the first side by the image former, and wherein the image former corrects an image forming position in which the image is formed on the second side of the sheet based on the amount of the change in the length of the sheet.

21. The image forming system according to claim 1, wherein the calculator is configured to calculate the amount of the change in the length of the sheet in a conveyance direction of the sheet based on the elapsed time from the time when the sheet passes through the heater to a time when the post-processing is performed by the post-processing apparatus, wherein the post-processing apparatus performs the post-processing at a processing position on the sheet on which the image is formed by the image former, and wherein the post-processing apparatus changes the processing position based on the amount of the change in the length of the sheet.

22. An image forming system comprising:

an image former configured to form a toner image on a sheet;

a heater configured to heat the sheet to fix the toner image to the sheet; and a post-processing apparatus configured to perform a post-processing on the sheet on which the image is fixed by the heater, wherein the post-processing apparatus is configured to perform the post-processing at a processing position on the sheet on which the image is formed by the image former, and wherein the post-processing apparatus changes the processing position based on an elapsed time from a time when the sheet passes through the heater.

* * * * *